US012580888B2

(12) United States Patent
Choudhry et al.

(10) Patent No.: US 12,580,888 B2
(45) Date of Patent: Mar. 17, 2026

(54) SECURE UNIDIRECTIONAL NETWORK ACCESS USING CONSUMER-CONFIGURED LIMITED-ACCESS ENDPOINTS

(71) Applicant: Amazon Technologies, Inc., Seattle, WA (US)

(72) Inventors: Akshay Choudhry, Sunnyvale, CA (US); Stewart Allen, Seattle, WA (US); Alexey Kuznetsov Kuznetsov, Carnation, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 18/622,605

(22) Filed: Mar. 29, 2024

(65) Prior Publication Data

US 2025/0310300 A1 Oct. 2, 2025

(51) Int. Cl.
*H04L 9/40* (2022.01)
*G06F 9/455* (2018.01)

(52) U.S. Cl.
CPC ...... *H04L 63/0236* (2013.01); *G06F 9/45558* (2013.01); *G06F 2009/45587* (2013.01); *G06F 2009/45595* (2013.01)

(58) Field of Classification Search
CPC ............. H04L 63/0236; G06F 9/45558; G06F 2009/45587; G06F 2009/45595
See application file for complete search history.

(56) References Cited

U.S. PATENT DOCUMENTS 8,397,286 B2 3/2013 Declety et al.
8,543,665 B2 9/2013 Ansari et al.
9,787,499 B2 10/2017 Miller et al.
10,021,196 B1 7/2018 Akers et al.
10,397,189 B1 * 8/2019 Hashmi ............... H04L 63/0272
10,609,029 B2 3/2020 Leconte et al.
10,708,125 B1 * 7/2020 Chen ................... H04L 65/1046
10,797,989 B2 10/2020 Tillotson et al.
10,965,495 B2 3/2021 Paredes et al.
11,368,437 B2 6/2022 Wimmer et al.
(Continued)

FOREIGN PATENT DOCUMENTS

WO 2016044769 A1 3/2016
WO 2020263640 A1 12/2020

OTHER PUBLICATIONS

International Search Report and Written Opinion mailed May 9, 2025 in PCT/US2025/019996, Amazon Technologies, Inc., 14 pages.

*Primary Examiner* — Viet D Vu

(74) *Attorney, Agent, or Firm* — Robert C. Kowert; Kowert, Hood, Munyon, Rankin and Goetzel, P.C.

(57) ABSTRACT

A virtual gateway for transmission of packets from a service provider virtual network to a service consumer virtual network of a user is established at a cloud computing environment. A limited-access endpoint is created in the service consumer virtual network, with security settings provided by the user which enable transmission of packets from a service implemented at the service provider virtual network to resources within the service consumer virtual network. A packet directed to a resource in the service consumer virtual network is received at the gateway from the service. If the security settings permit delivery of packets via the endpoint to the resource, the packet is transmitted to the resource.

20 Claims, 12 Drawing Sheets

(56) References Cited

U.S. PATENT DOCUMENTS

| | | | | |
|---|---|---|---|---|
| 2010/0124228 | A1* | 5/2010 | Tinnakornsrisuphap | H04W 76/12 709/230 |
| 2023/0388390 | A1 | 11/2023 | Akers et al. | |

* cited by examiner

Example services 210 which need to initiate secure packet flows to CVNs

Server-less auto-triggered function execution services 230

Scalable container-based application implementation services 240

Remote resource health monitoring/administration services 250

Resource usage tracking services 260 (e.g., including tracking of ephemeral resources)

Auto-scaled multi-tenant application services 270

Auto-scaled single-tenant application services 280

. . .

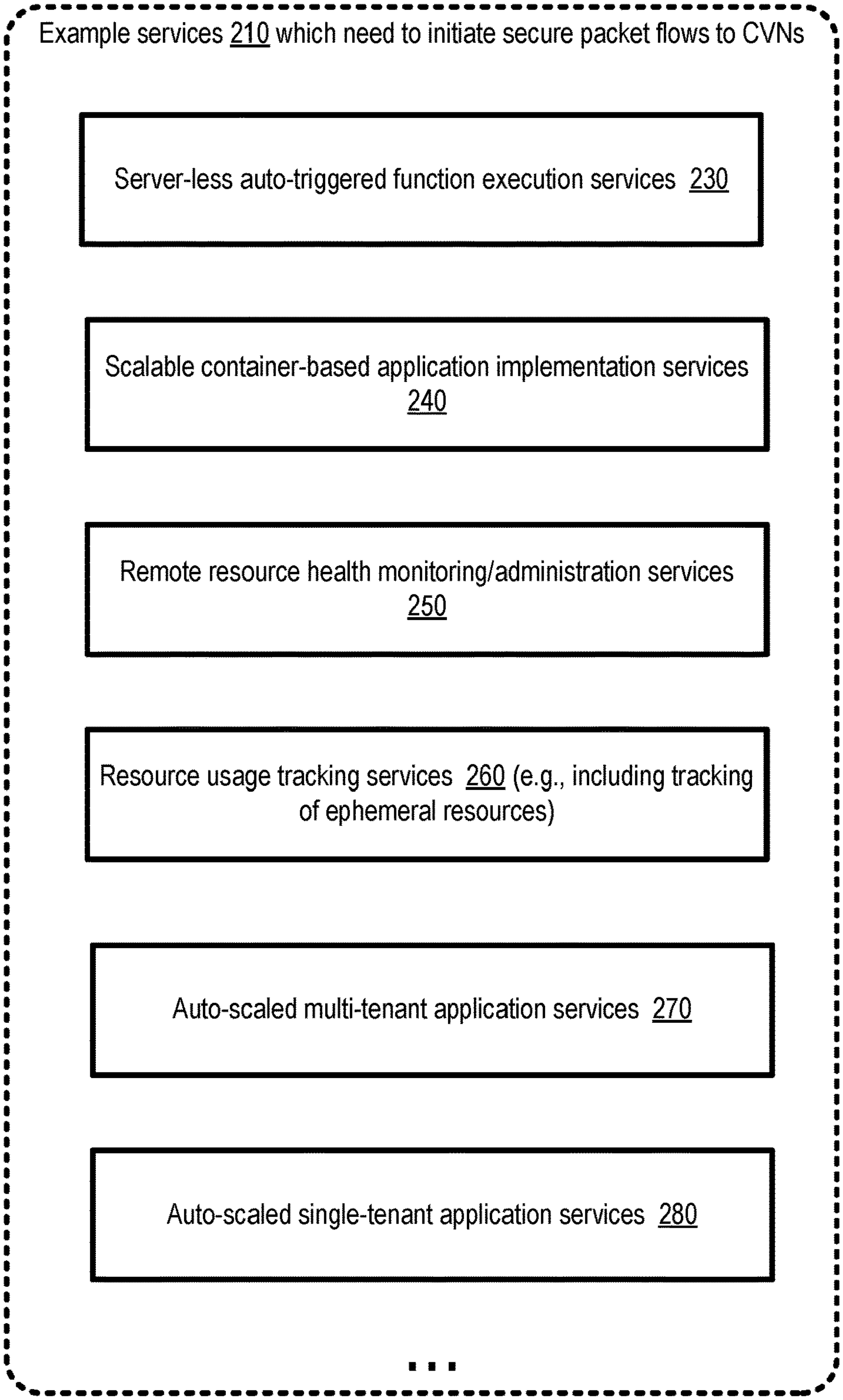

FIG. 2

Consumer defines server-less function, and triggering conditions for executing function  301

Service provider event detector determines that triggering condition has been met  305

Function execution resource FER is identified at PVN, without receiving guidance about resource selection from consumer 310

Function execution is initiated at FER 315

To complete function execution, data may be needed from consumer-side data source, or results may have to be sent to consumer-side resource  325

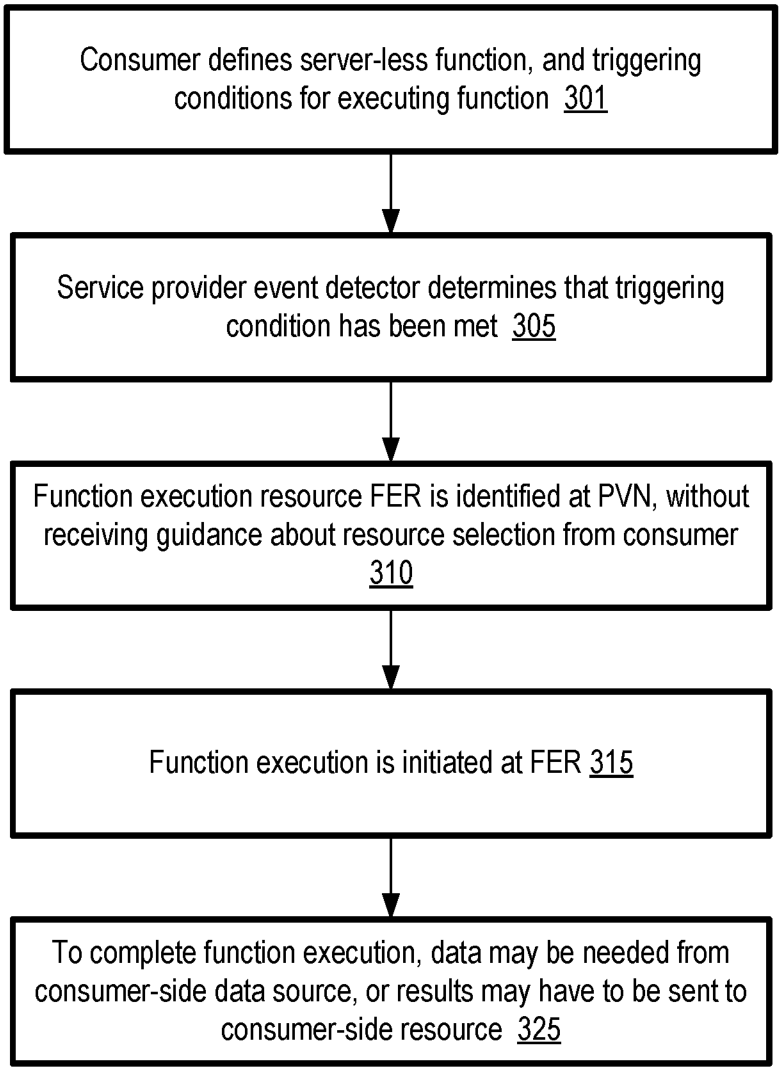

*FIG. 3*

Service Consumer Virtual Network (CVN) 501

Consumer-side target resource (CTR) 505

IP address B (within CVN private address range (CPAR))

Transformed packet 534 (src = A, dst = B, payload = P)

Consumer-side limited-access endpoint (CLE) 509

Security settings 511

IP address A (within CPAR)

To consumer-side resource, packet contents that actually originated at PVN appear to instead originate at CLE 509

Logical connection 590, which can be used for isolated transmission of packets via numerous tunnels (e.g., from respective SIRs to the SVG)

Scalable virtual gateway (SVG) 522

IP address K (within PVN private address range PPAR)

Security settings 512

Encapsulation packet 535 (src = L, dst = K)

Baseline packet 533 (src = L, dst = B, payload = P)

Tunnel 555

Service implementation resource (SIR) 562

IP address L (within PPAR)

Service Provider Virtual Network (PVN) 551

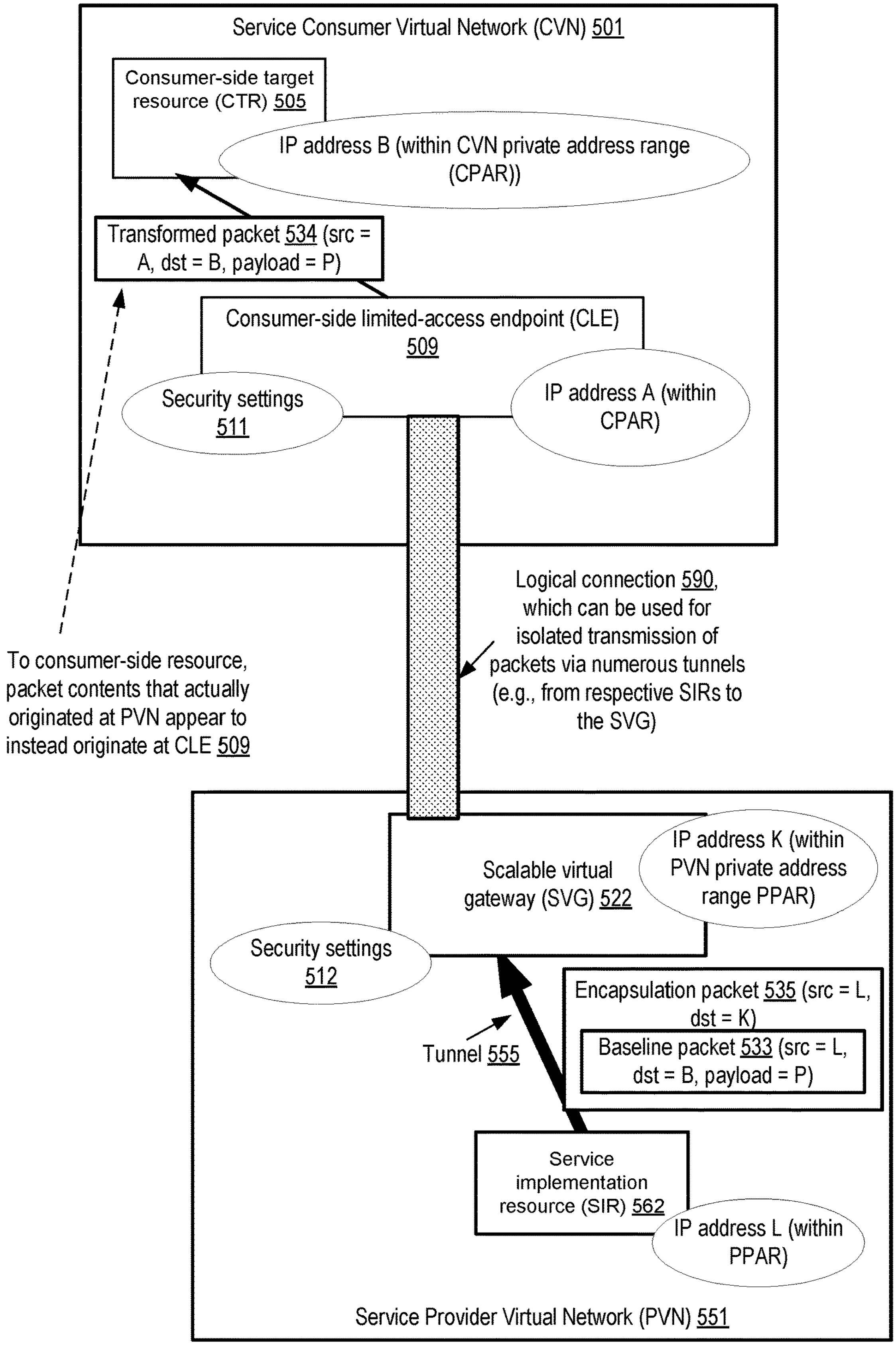

FIG. 5

Consumer-side security settings 830 (selected/defined by consumer)

Network access settings 840 (e.g., firewall rules, security groups, network access control lists)

Functionality constraints 842 (e.g., kinds of consumer-side actions permitted to service provider based on defined roles/capabilities)

■ ■ ■

Provider-side security settings 850 (selected/defined by service provider)

Gateway access settings 860 (e.g., subset of service implementation resources permitted to establish tunnels to gateway)

Max-CLE-connected limit 862

Tunnel ID protection settings 864 (e.g., incorrect tunnel ID usage attempt limits, tunnel ID size, tunnel ID expiration and rotation settings)

■ ■ ■

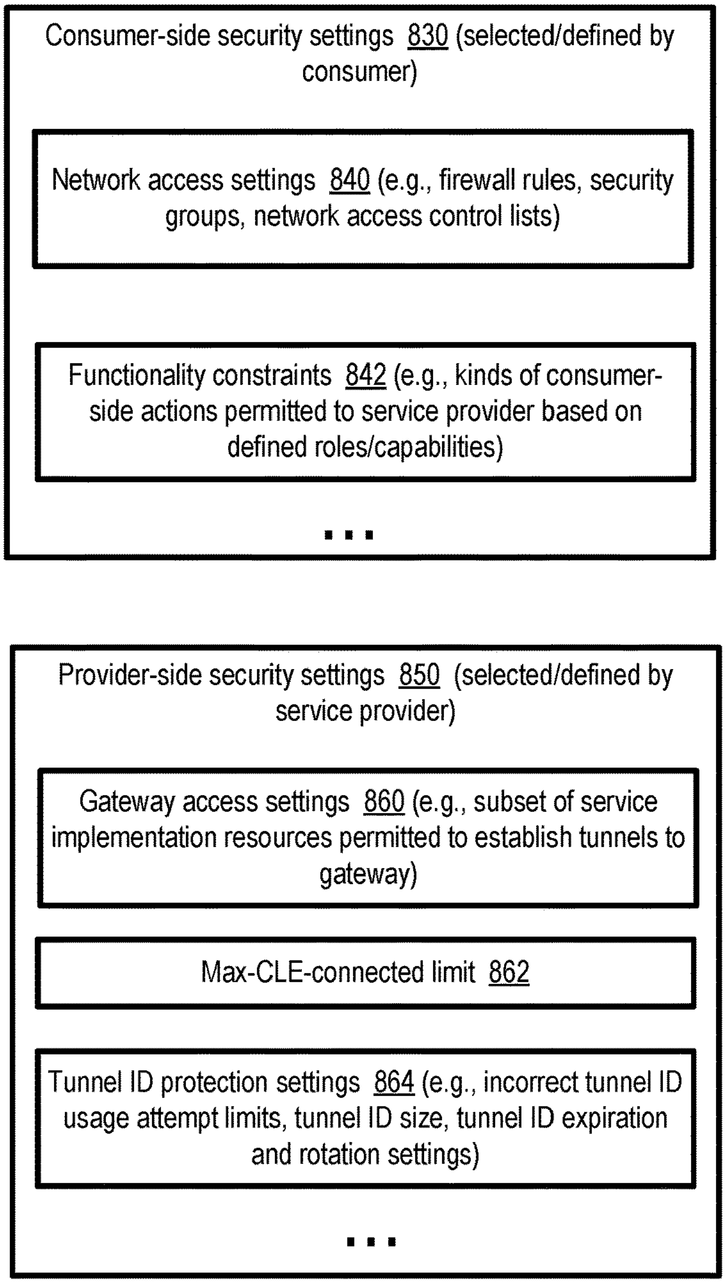

FIG. 8

Establish a service provider virtual network (PVN) (at which a service Svc1 is implemented) and a service consumer virtual network (CVN) comprising respective sets of resources of a VCS of a cloud computing environment 1101

Establish a scalable virtual gateway (SVG) with a private network address SVGAddr in PVN's address range, e.g., comprising a set of nodes of a packet processing service of the VCS, which can collectively efficiently perform packet processing tasks such as network address translation, encapsulation/decapsulation of packets, etc. 1104

Establish a consumer-side limited-access endpoint (CLE) in the CVN, assigned a private network address CLEAddr within the CVN's address range; obtain security settings of the CLE from the owner of the CVN, indicating which subset of resources within the CVN can be accessed from the PVN via the CLE 1107

Create a network channel (e.g., a tunnel set up in accordance with an encapsulation protocol) between a service implementation resource SIR1 (e.g., a virtual machine) in the PVN and the SVG 1110

Store a mapping M1 between the channel and the CLE 1113

Receive, at the SVG, via the channel, an encapsulation packet which includes an encapsulated baseline packet P1 with a destination address DA1 in the CVN, a source address SA1 of SIR1, and a data payload DP1 which is generated to implement Svc1 operations 1116

Determine, using M1, that P1 is associated with CLE, and verify that security settings of CLE permit delivery of data to DA1 via the CLE 1119

Prepare a transformed version P2 of P1, with the same payload DP1, destination address DA1, and source address CLEAddr, and provide the transformed version to DA1 1122

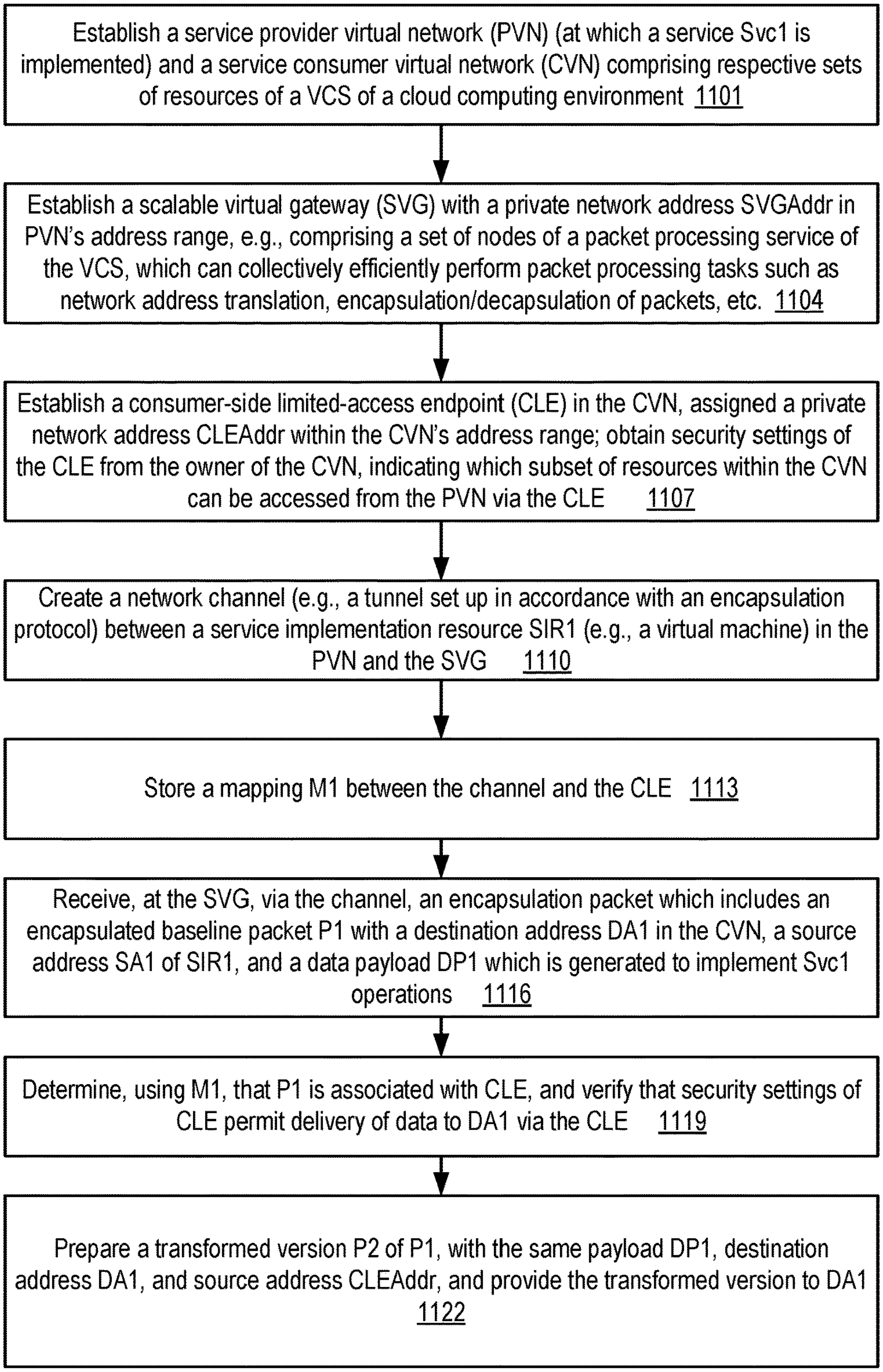

FIG. 11

SECURE UNIDIRECTIONAL NETWORK ACCESS USING CONSUMER-CONFIGURED LIMITED-ACCESS ENDPOINTS

BACKGROUND

Many cloud computing environments provide support for isolated virtual networks, sometimes referred to as virtual private clouds (VPCs), comprising virtual machines and other resources that can be used by customers to run their applications in isolated environments. The customers can select various networking configuration settings for their virtual networks, including Internet Protocol addresses for the resources within the virtual networks. Some customers of the cloud computing environments can use such virtual networks to implement their own applications and services, which can be utilized by other customers who may have resources within their own virtual networks. Depending on the nature of the services being provided, network packet flows directed to virtual networks of service consumers may sometimes be initiated within the virtual networks of the service providers.

BRIEF DESCRIPTION OF DRAWINGS

FIG. 2 illustrates examples of services, implemented at service provider virtual networks, which may require network access to at least some portions of service consumer virtual networks, according to at least some embodiments.

FIG. 3 is a flow diagram illustrating aspects of operations of a server-less automatically triggered function execution service which may require access to consumer-side virtual networks, according to at least some embodiments, according to at least some embodiments.

FIG. 5 illustrates an example establishment of a network tunnel between a service implementation resource and a virtual gateway within a service provider virtual network to enable the service implementation resource to transmit messages to a consumer-side resource within a service consumer virtual network, according to at least some embodiments.

FIG. 8 illustrates examples of consumer-side and provider-side security settings pertaining to network traffic flows which originate at service provider networks and are directed to destinations within service consumer networks, according to at least some embodiments.

FIG. 11 is a flow diagram illustrating aspects of operations, pertaining to the transmission of messages from service provider virtual networks to consumer-selected subsets of service consumer virtual networks, according to at least some embodiments.

Figure 1:
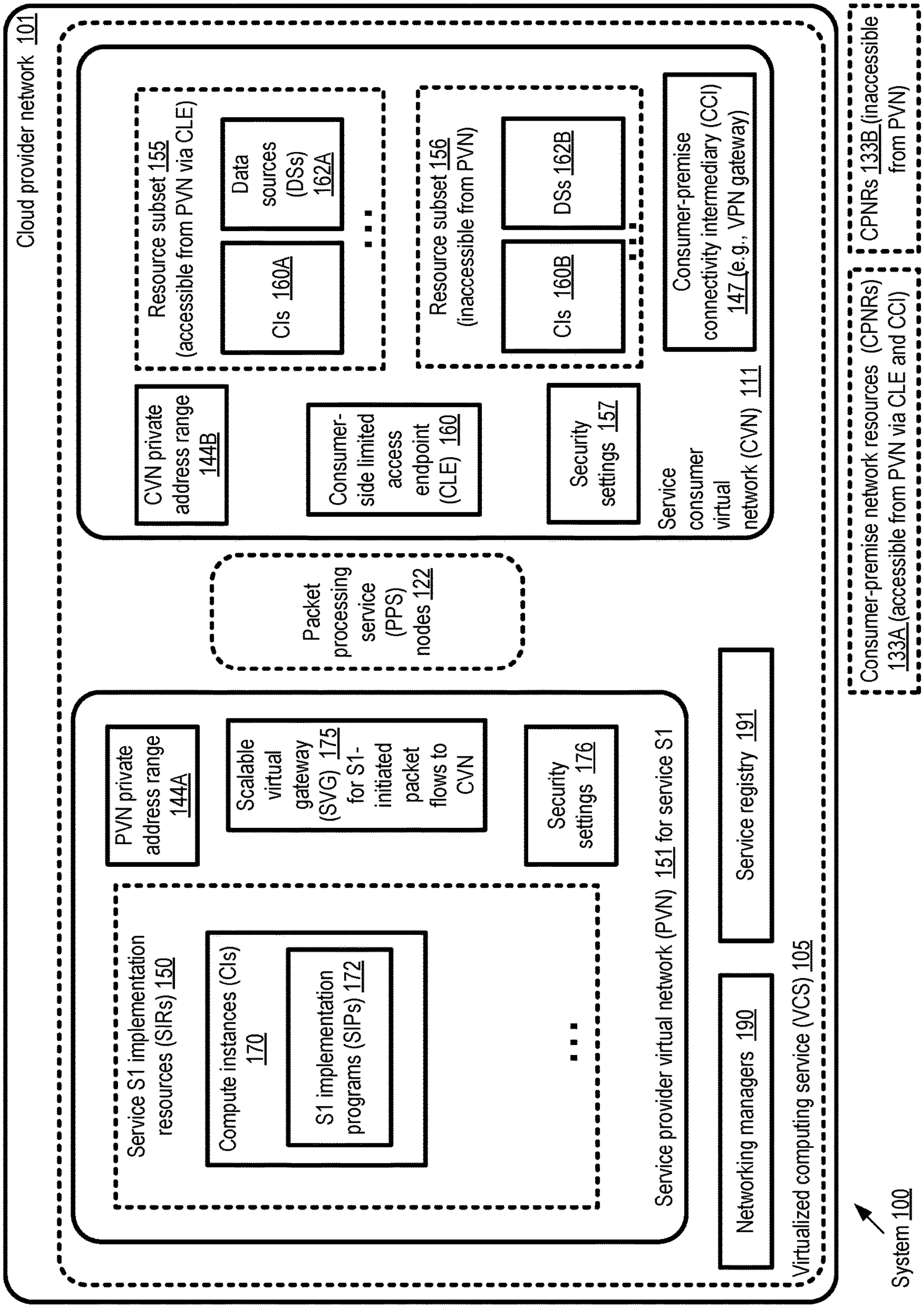
FIG. 1 illustrates an example system environment in which limited-access endpoints may be set up within cloud computing environments to enable access from service provider virtual networks to service-consumer-selected subsets of resources within the service consumers' virtual networks, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

In modern computing environments, organizations often rely on virtualized network infrastructures, such as Virtual Private Clouds (VPCs), to host and manage their applications and services. While these VPCs provide isolated and secure environments, there are scenarios where third-party service providers or centralized administrators need to access resources within a customer's VPC or on-premises network for various purposes, such as monitoring, maintenance, or service integration. Existing solutions, such as VPC peering or resource-level access mechanisms, have limitations in terms of scalability, flexibility, and granular access control, making it challenging to provide secure and controlled access to these third-party entities while adhering to least privilege principles.

The present disclosure introduces a connectivity solution that enables secure, unidirectional access from a service running in one virtualized network environment to specific portions of another virtualized network environment and interconnected networks. The disclosed techniques allow third-party service providers and centralized network administrators to access designated segments or subnets of their clients' virtualized networks or on-premises infrastructures, without exposing the entire infrastructure. This allows clients to grant restricted access to their networks to authorized service providers or administrators while retaining control over access permissions through the use of security policies. Conversely, service providers benefit from a secure access channel to privately and unidirectionally access the necessary portions of their clients' networks, enabling seamless service integration, monitoring, and resource management, even for ephemeral or dynamically scaled resources.

Some providers of network-based services can use resources of cloud computing environments to implement the services and enable other customers of the cloud computing environments to make use of the services. For example, a given service can be implemented within an isolated virtual network (IVN) or virtual private cloud (VPC) set up at a virtualized computing service (VCS) of a cloud provider network, and potentially used for performing tasks on behalf of service consumers who have resources within their own IVNs. An IVN refers to a collection of resources, such as compute instances (virtual machines) and associated networking infrastructure elements, which is logically isolated or separated from the rest of the resources with respect to at least some types of networking configuration settings. For example, a VCS customer on whose behalf a given IVN is established may choose a range of private network addresses usable for the compute instances of that IVN, without having to be concerned about possible overlaps between that range and private network addresses being used within other IVNs, and without having to advertise the addresses outside the given IVN. The VCS customer can set up subnets with respective firewall settings for inbound and outbound traffic chosen by the customer, and so on. IVNs in effect enable a VCS customer to use cloud-based resources as though the resources were within a private unshared network at a premise owned by that customer. An IVN within which a service is implemented can be referred to as a service provider virtual network (PVN), while an IVN set up on behalf of a consumer of the service can be referred to as a service consumer virtual network (CVN).

For some types of services, clients of the service (e.g., programs running at compute instances within a CVN) may initiate communication with the service, e.g., by sending a service request to a publicly accessible address associated with the service. The service can respond to the initial communication, e.g., by sending a response to the service request. However, for other types of services, communication directed to one or more destinations within a CVN may have to be initiated at a service implementation resource within a PVN. For example, some services run at a PVN can offer remote network monitoring or health tracking functionality: the service provider assumes the responsibility of checking the health status of a specified subset (or all) of the applications running on compute instances within a CVN, thereby reducing the administrative burden on the CVN owner. Health checking agent programs running at resources within the PVN used for such a remote health checking service would need access to the monitored resources (e.g., the ability to send heartbeats or similar messages) within the CVN. Such access may be required to be unidirectional or asymmetric with respect to initiation of the communication—e.g., the agents may have to be allowed to access monitored resources, but the monitored resources may not be allowed to access the agents on their own, for security and other reasons. The monitored resources can of course respond to the messages sent by the agents in this example, but they cannot initiate communication sessions or connections to the agents. The owner of the CVN may wish to restrict the set of resources within the CVN that are to be monitored by the remote monitoring service, instead of enabling every resource to be accessed.

A number of different kinds of services implemented at a PVN may require this pattern of unidirectional initiation of communication. Another example of such a service is a server-less automatically triggered function execution service (sometimes referred to as a lambda service or a functional programming service). A consumer of such a service can define a function whose logic is to be executed in response to a triggering event (also defined by the consumer), without the consumer having to choose the specific resources at which the function is to be executed. The service provider can implement event detectors for the function and choose execution resources for the function within a PVN. When a triggering event occurs, it can be detected by an event detector, and run the function at a particular resource selected at the PVN. In some cases, the execution of the function can require access to data stored within a CVN, so communication can be initiated from the PVN to the CVN to obtain the data. In addition, in some cases, messages indicating the status of the execution of the function, or a result of the function, can be provided from the PVN to the CVN, without informing the service consumer about the details of the function execution resource(s) being used.

The present disclosure relates to methods and apparatus for facilitating such patterns of secure PVN-initiated communication directed to CVNs using a set of networking constructs and infrastructure of a VCS. On the service provider side, the owner or administrator of a PVN can set up a scalable virtual gateway (SVG) within the PVN for processing such traffic, using programmatic interfaces of the VCS to request establishment of the SVG. On the service consumer side, the owner or administrator of a CVN can use programmatic interfaces of the VCS to set up a consumer-side limited-access endpoint (CLE), and specify security settings for the CLE to restrict (if desired) the set of resources that can be accessed within the CVN from the PVN. Nodes of a distributed packet processing service (PPS) of the VCS, as well as networking virtualization management components of the VCS, can be used to implement the SVG and the logic used for the PVN-initiated communication. The PPS nodes and networking virtualization management components of the VCS can collectively be referred to as a distributed networking manager (or simply a networking manager) of the VCS.

In an initialization phase of the interaction between the PVN and the CVN, a logical connection can be set up between the SVG and the CLE by the networking manager after both the PVN owner and the CVN owner approve via programmatic interfaces. The establishment of a logical connection can be represented by metadata stored by a networking manager indicating that the SVG can henceforth be used for sending one or more packet flows to resources within the CVN via the CLE (e.g., using respective secure channels or tunnels as described below). As such, the establishment of a logical connection can be considered a pre-requisite step before packets can be sent from service implementation resources to the CVN. Upon approving a logical connection, the PVN owner can be provided a unique virtual connection identifier (VCI), generated by the networking manager, corresponding to the CLE with which the logical connection is established. After the logical connection is set up, service implementation resources (SIRs) (e.g., compute instances of the PVN at which programs implementing the business logic of the service run) that need to initiate communications with destination resources in the CVN can request the creation of secure networking tunnels or channels to the SVG, using the unique VCI to indicate the CLE which is to be used for the communications on the consumer side. A mapping between a tunnel/channel (e.g., between an identifier assigned to the tunnel/channel) and the CLE for which the tunnel is created can be stored in metadata accessible to the packet processing nodes implementing the SVG. Similar mappings can also be created for other channels and other CLEs which are set up.

Once a tunnel associated with a CLE set up within the targeted CVN has been established between an SIR and the SVG, packets that are to be sent to the destination resources can be encapsulated and transmitted via the tunnel from the SIR to the SVG. The data payloads of such packets can comprise content generated by the SIR as part of implementing operations of the service of the PVN. The SIR and the SVG can each be assigned network addresses within a PVN address range chosen earlier by the PVN owner, while the CLE and the target destination resource within the CVN can each be assigned network addresses within a CVN address range chosen earlier by the CVN owner. The destination address of the original or baseline packet (the version of the packet which has not yet been encapsulated) generated by the SIR can be the address of the target destination within the CVN, while the source address can be the address of the SIR itself. The baseline packet can be enclosed within an encapsulation packet, whose destination address is the address of the SVG.

Packet processing nodes implementing the SVG can receive the encapsulation packet via the tunnel. The mapping associated with the tunnel can indicate the particular CLE with which the encapsulation packet and its contained baseline packet are associated. A determination can be made (e.g., by the SVG nodes, and/or by other components of the networking manager) whether the security settings chosen earlier by the CVN owner permit delivery of packets or data via the CLE to the target destination within the CVN. If such delivery is permitted, a transformed version of the baseline packet which was enclosed within the encapsulation packet can be generated and delivered to the target destination. The data payload of the transformed version can be left unchanged from the data payload as the baseline packet, thereby providing the service operation related content generated by the SIR to the target destination. The destination address of the transformed version can be set to the target destination's address, while the source address of the transformed version can be set to the network address of the CLE. As such, to the target destination resource, the packet appears to have originated within the CVN itself, rather than in a different virtual network. If the target destination generates a response to the packet, that response can be sent from the target destination to the network address of the CLE, and the mapping between the CLE and the tunnel can be used to transmit the response to the SIR using encapsulation along the reverse path of the path taken by the PVN-to-CVN packet. Subsequent packets (if any) between the SIR and the target destination can be processed similarly.

In some cases, at the request of the owner of a CVN, connectivity may have been established between the CVN and an external premise of the CVN owner (e.g., a premise at which an office or private data center of the owner has been set up). Any of several kinds of networking constructs of the VCS can be used for such connectivity, such as a Virtual Private Network (VPN) gateway or a dedicated private physical network link referred to as a Direct Connect link. In such cases, the security settings that the CVN owner has chosen for the CVN and the CLE can also allow the SIRs to access a subset of resources (such as servers) at the external premise via the same CLE that is used to enable the SIRs to access resources within the CVN. Because the networking manager makes network packets from the PVN appear to originate within the CVN as described above, such packets can be accepted at the external premise in the same way as packets which actually did originate at the CVN would be. Thus, the functionality being provided by the service implemented at the PVN can also be made available at the external premise.

Details about the SIRs (such as their network addresses, or even that the SIRS exist) can be kept hidden from any of the resources within the CVN (or external premises of the CVN owner). As a result, communication cannot be initiated from the consumer side to entities within the PVN, thereby ensuring a high level of security for the service provider. In some cases, configuration metadata that explicitly prohibits the initiation of packet flows that originate at the CVN and are directed to the PVN via the CLE or the SVG can be generated and stored by the networking manager. If an attempt to establish a connection from the CVN to the PVN via the CLE or SVG is made, the attempt can be rejected based on the metadata. At the same time, the owner of the CVN can restrict (using security settings specified by the owner of the CVN) the subset of resources that can be accessed within the CVN (and/or external premises of the CVN owner) from the service implemented at the PVN, thereby providing a fully customizable level of flexibility regarding access control to the CVN owner. The internal high-speed high-bandwidth networking infrastructure of the VCS can be used for the communications between the PVN and the CVN, making such communications faster and more secure than would have been the case if links of external networks (such as the public Internet) were used. Note that some conventional technologies for enabling communication across virtual network boundaries (such as techniques referred to as VPC peering) may by default allow communication to be initiated in both directions between a pair of virtual networks, which may not meet the security requirements of some service providers. Other conventional technologies for enabling such communications may require load balancers to be set up at one or more of the virtual networks. The techniques introduced herein do not require load balancers.

As one skilled in the art will appreciate in light of this disclosure, certain embodiments may be capable of achieving various advantages, including some or all of the following: (a) enabling a wider variety of services to be implemented securely within virtual networks of cloud computing environments, and made available for use to consumer-side resources within or external to the cloud, while satisfying stringent security requirements of the service providers with very little administrative effort required from the service providers and/or (b) providing fine-grained control, to the owners or administrators of service consumer virtual networks, with regard to access to consumer-side resources by service providers.

According to some embodiments, a system may include a networking manager of a VCS of a cloud computing environment or provider network, and a set of virtual networks established within the VCS. The networking manager may be implemented in a distributed manner in some embodiments and may for example comprise a set of control plane (administrative) nodes and a set of data plane nodes such as nodes of a packet processing service. The set of virtual networks may include a service provider virtual network (PVN) and a service consumer virtual network (CVN). In various embodiments, the PVN may include a virtual machine or compute instance of the VCS, at which at least a portion of the logic of a particular service (e.g., a third party service owned by one customer of the cloud computing environment, and made available to other customers or clients of the cloud computing environment) is implemented. The virtual machine at which the service logic is run may be referred to as a service implementation resource or SIR. The CVN may also include a set of virtual machines, data sources and/or other resources of a customer of the cloud computing environment. In some cases, instead of a third-party service, a first-party service (a service implemented by the operator of the cloud provider network) may be run within a PVN. As such, customers of the cloud provider network may access both first-party services and third-party services executed at PVNs from CVNs, and PVN-to-CVN communications of the kind introduced above may be facilitated for both first-party and third-party services in some embodiments. The terms "customer", "client" and "user" may be used synonymously herein.

To enable secure PVN-to-CVN communications, a number of logical networking constructs or entities may be created with the help of the networking manager in various embodiments. For example, in response to a programmatic request from an administrator of the PVN, a scalable virtual gateway (SVG) may be established for transmission of packets originating at the PVN to one or more CVNs. The SVG may be assigned at least one network address within a private address range of PVN; this address may not be advertised within, or accessible from, the CVN. Another programmatic request may be submitted by an administrator of the CVN to establish a consumer-side limited-access endpoint (CLE) within the CVN, which can then be used to enable packets of packet flows originating at the PVN to be delivered to a specified subset (or all) of the resources within the CVN. The request to create the CLE may include an identifier of the service which is implemented within the PVN in at least some embodiments. The CVN administrator may obtain the service identifier from a registry of services accessible via the VCS. The CLE may be assigned a network address from within a private address range of the CVN; this network address may not be advertised at, or accessible from, the PVN in various embodiments. Security settings of the CLE, provided to the networking manager by the administrator of the CVN, may prevent transmission of network packets via the CLE to at least some subset of the CVN's resources in some cases.

A determination may be made in some embodiments by the networking manager that an encapsulation protocol tunnel or secure channel has been set up between (a) a virtual machine implementing the service at the PVN, and (b) the SVG. In some cases, the tunnel may be created by the networking manager itself at the request of an administrator of the PVN. A mapping between the tunnel and the CLE (e.g., a mapping between an identifier assigned to the tunnel, and an identifier assigned to the CLE) may be generated and stored in a configuration metadata repository of the VCS.

After the tunnel has been established and the mapping has been stored, packet flows originating at SIRs and directed to target destination resources within the CVN may commence in various embodiments. A particular baseline packet directed to a resource within the CVN may first be created and then encapsulated within a second packet, referred to as an encapsulation packet. The data payload portion of the baseline packet may be generated by a program implementing the business logic of the service of the PVN at an SIR. The destination address of the baseline packet may be set to an address of the resource within the CVN, and the source address may be set to the address of the SIR in some embodiments. The destination address of the encapsulation packet may be set to the network address of the SVG, the source address may remain set at the address of the SIR. The payload portion of the encapsulation packet may comprise the baseline packet as a whole in some implementations; in other implementations, only the data payload of the baseline packet may be included in the payload portion of the encapsulation packet.

When the encapsulated packet is received at the SVG via the tunnel, the tunnel's mapping may be examined, and a determination may thereby be made that the packet is associated with the CLE. The security settings chosen by the administrator of the CVN may be checked, e.g., by the networking manager in some embodiments, to determine whether transfer of messages to the targeted CVN resource via the CLE is permitted. If such transfers are permitted, a transformed version of the baseline packet may be generated and sent to the targeted CVN resource. The transformed version may indicate the network address of the CLE (instead of the network address of the SIR, or the network address of the SVG, both of which are within the network address range of the PVN) as the source address, making it appear that the packet originated within the CVN. The data payload comprising content generated by the SIR may be provided as the data payload of the transformed version.

Several kinds of services whose SIRs require access to CVN resources may be implemented at a PVN in different embodiments. One such service may allow service consumers or clients (e.g., administrators or end users of the CVN) to define server-less functions which are to be executed on behalf of the consumers by the service provider, e.g., using resources within a PVN, without requiring the consumer to specify or acquire the resources. The client may also define the conditions or events which are to trigger the execution of the function. In some cases, the execution of the function may require access to data stored at the CVN. A request for the data may be included in the payload portion of a message sent via the tunnel to the SVG, and from the CLE to the CVN resource at which the data is stored.

Another service implemented at the PVN may comprise a remote resource health-checking service. SIRs of the health-checking service may send health query messages to resources within the CVN via the SVG and determine the health status of the resources based on contents of responses to such messages. The health status may then be provided to one or more destinations by the service.

In some embodiments, the PVN service may comprise a remote ephemeral event tracking service. Ephemeral events are events that last a very short time, and hence may be difficult to monitor. For example, for some types of applications run at a CVN, virtual machines may be spun up to execute tasks, assigned respective network addresses for communications associated with the tasks, and then shut down as soon as the tasks are complete (which may take less than a few seconds). In one embodiment, the data payload sent to the CVN via the SVG and the CLE from an SIR may comprise a query to a network address assignment program at the CVG, which can provide records of the assignment of addresses to the virtual machine or other ephemeral entities. The response to such a query, also received via the CLE and/or the SVG, may be used by an SIR to determine whether ephemeral events of one or more types have occurred in the CVN. A report of the occurrences of such events may be sent to one or more destinations by the SIR.

A PVN may be used in some embodiments to implement a container-based application execution service. Consumers or clients of such a service may provide an indication of one or more software containers (e.g., a respective virtual machine image of individual ones of the containers) that are to be used to execute applications on behalf of the clients, and the conditions that are to trigger the execution of the containers. Data needed to execute the containers may be stored at the CVN, and an SIR implementing the container-based application execution service may transmit messages to the appropriate data sources within the CVN via the SVG in such embodiments.

In at least some embodiments, a service implemented at a PVN may be multi-tenant, in that for example respective sets of service operations may be executed at a single SIR on behalf of several service consumers with respective CVNs. In one such embodiment, a single SVG may be used for transmitting messages from the multi-tenant service to the different CVNs, with a respective CLE set up in each of the CVNs for the traffic originating at the SIR. Respective tunnels may be set up between an SIR and the SVG for isolating the traffic of the different consumers in some embodiments.

In one embodiment, a single CLE may be set up in a CVN to enable reception of messages from SIRs at multiple PVNs (e.g., with a different service being implemented in each PVN). In other embodiments, multiple CLEs may be established within a single CVN to enable traffic associated with respective PVNs to be received.

A number of different techniques may be used for setting up the communication channels between SIRs and the SVG. In some cases, the communication channels may comprise tunnels established in accordance with an encapsulation protocol (such as the Generic Network Virtualization Encapsulation or Geneve protocol) as indicated above, e.g., using commands or system calls similar to Linux's "ip link" and the like. In other cases, a kernel driver incorporated into an operating system of the SIR may be used to create the channel or tunnel. In one embodiment, the SIR may comprise a virtual machine run at a virtualization host which includes a virtualization management offloading card (VMOC). The VMOC may be used to offload some of the overhead associate with virtualization management, so that more of the computing capacity of the primary processors or CPUs of the host can be devoted to application workloads than to virtualization management tasks. In such an embodiment, a virtual interface created at the VMOC may be used to establish the channel to the SVG. In some embodiments, e.g., in scenarios in which Internet Protocol Version 4 (IPv4) addresses are assigned to resources within the CVN, Internet Protocol Version 6 (IPv6) addresses may be used to implement or represent the channels. IPv6 has such a large range of addresses available that it may be possible to use a subset of the range as unique identifiers for CLEs (or even for target resources in the CVN to which messages from the PVN are to be sent). When a message is to be sent to a resource within the CVN from an SIR, the SIR may simply use an IPv6 address which is mapped to the CLE or the resource as the destination address for the baseline packet. The networking manager of the VCS may then in effect translate the IPv4 address to the correct IPv4 address (e.g., the address of the CLE or the destination resource within the CVN) and cause the baseline packet contents to be delivered to the intended destination.

As indicated earlier, in at least some embodiments, SVGs and CLEs of the kind introduced above may be implemented at a VCS of a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs).

This compartmentalization and geographic distribution of computing hardware enables the cloud provider network to provide low-latency resource access to customers on a global scale with a high degree of fault tolerance and stability.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which limited-access endpoints may be set up within cloud computing environments to enable access from service provider virtual networks to service-consumer-selected subsets of resources within the service consumers' virtual networks, according to at least some embodiments. As shown, system 100 includes resources and artifacts of a virtualized computing service (VCS) 105 of a cloud computing environment or cloud provider network 101. The VCS includes a service registry 191 in which information about services being implemented by VCS customers within respective service provider virtual networks (PVNs) is stored at the request of the service providers. Potential service consumers may search for registered services of interest, e.g., by submitting queries to the registry, and utilize selected services from or at service consumer virtual networks (CVNs) in the depicted embodiment. Both service providers and service consumers may be referred to as clients or customers of the VCS. The VCS may comprise a collection of networking managers 190 which are responsible for (among other tasks) responding to networking-related programmatic requests from VCS clients, received via interfaces such as web-based consoles, command-line tools, application programming interfaces (APIs), graphical user interfaces and the like, and also for orchestrating the flows of network packets between various virtual networks such as CVNs and PVNs. In the depicted embodiment, the VCS may also comprise a fleet of packet processing service (PPS) nodes 122. The networking managers may include control plane components or nodes, as well as data plane components or nodes in various embodiments. The control plane nodes may respond to programmatic requests from clients of the VCS, while the data plane nodes (which may include the PPS nodes) may transfer packets containing application data on behalf of the clients.

In the example scenario shown on FIG. 1, a service S1 is implemented at a PVN 151 of VCS 105. Service S1 implementation resources (SIRs) 150 may include compute instances (CIs) 170 at which S1 business logic implementation programs (SIPs) 172 are executed. The S1 provider (client C1 of the VCS) may have chosen a PVN private address range 144A for resources within PVN 151. Addresses within the private address range 144A may not be advertised outside, or made accessible to entities outside, the PVN 151. In order to provide the functionality of S1, SIRs such as CIs 170 (e.g., SIPs within the SIRs) may require access to at least a subset of resources within the CVNs of S1 consumers.

To enable packet flows to be initiated from PVN 151 to CVN 111 (and in some cases to other CVNs not shown in FIG. 1), a scalable virtual gateway (SVG) 175 may be set up by a networking manager 190, e.g., in response to a programmatic request from the client who plans to provide the service S1 to one or more consumers. The SVG may be assigned at least one network address (e.g., an IPv4 address, or an IPv6 address) from PVN private address range 144A in the depicted scenario. Security settings 176 may be defined for traffic associated with the SVG 175 and other resources of the PVG in the depicted embodiment—for example, such security settings may help ensure that communications to CVNs may only be initiated from a subset of SIRs, and not from any other resource within the PVN.

CVN 111 may have been set up at the request of a different VCS client C2 that wishes to utilize service S1 in the depicted embodiment. The resources of CVN 111 may comprise at least two subsets: resource subset 155 to which C2 wishes to enable network access from service S1 of PVN 151, and resource subset 156 to which C2 does not want service S1 SIRs to be provided access. Resource subset 155 may, for example, comprise CIs 160A and data sources (DSs) (e.g., databases) 162A, while resource subset 156 may comprise CIs 160B and DSs 162B. A CVN private address range 144B may have been chosen by C2 for assignment of network addresses to resources within the CVN 111. Addresses within range 144B may in general not be advertised outside the CVN, or accessible from cloud provider network resources (such as resources within PVN 151) external to the CVN in at least some embodiments. Client C2 may, however, wish to enable connectivity between resources within CVN 111 and resources at an external premise (such as a data center owned/managed by C2, or an office facility of C2); these consumer-premise resources external to the cloud provider network may be provided some portion or all of the private address range 144B. The consumer-premise network resources (CPNRs) may also be classified by C2 into two categories in the depicted embodiment: CPNRs 133A to which the SIRs of S1 are to be granted access, and CPNRs 133B to which the SIRs of S1 are not to be granted access. A consumer-premise connectivity intermediary (CCI) 147, such as a Virtual Private Network (VPN) gateway, may have been established to transfer packets to/from the CPNRs in the depicted embodiment.

In response to programmatic request(s) from client C2, a consumer-side limited-access endpoint (CLE) 160 may be established within CVN 111 to enable packets from the PVN 151 to be received at resource subset 155 and CPNRs 133A. The CLE may be assigned an address from CVN private address range 144B. Security settings 157 of the CVN 111 may be chosen by client C2 in such a way that transfer of messages via the CLE 160 to resource subset 156 or CPNRs 133B is prohibited.

A logical connection between the SVG 175 and the CLE 160 in the depicted embodiment via a multi-step workflow which requires approval from the owners (C1 and C2) of both the PVN and the SVN. The consumer-side client C2 may indicate, via programmatic interfaces of the VCS, that the CLE 160 is to be used for traffic from S1 to the CVN 111; for example, a registered service identifier of S1 may be provided as a parameter in a message associated with the CLE sent to the networking manager. When the indication that the CLE 160 is to be used for S1 traffic is received, the networking manager may inform the PVN owner that the owner of CVN is requesting initiation of a logical connection between S1 and the CVN. If C1 approves, a message indicating that logical connection establishment also requires approval from C2 may be transmitted to C2 via the VCS programmatic interfaces. One C2 also approves, the logical connection may be established, and a virtual connection identifier (VCI) of CLE 160 may be provided to resources within the PVN that wish to initiate packet flows to resources within the CVN.

A secure communication channel, such as a tunnel of an encapsulation protocol, may be created between an SIR and the SVG within the PVG and used to send data from the SIR to resources in the CVN via the SVG and the CLE in the depicted embodiment. A mapping between the channel and the CLE may be generated and stored in metadata maintained by the networking manager in various embodiments. In some embodiments, the secure communication channel may be set up by the networking manager; in other embodiments, an SIP or other program running at an SIR may issue system calls or other operating system commands to establish the channel. Destination addresses within the CVN (e.g., an address of a CI 160A or a DS 162A) may be obtained by the SIP via DNS (Domain Name System) queries sent via the channel to DNS servers (identified using DHCP (Dynamic Host Configuration Protocol)) in some embodiments. In some implementations, DHCP may be used (e.g., using DHCP's Option Sets) to configure the secure channel in the context of the CVN.

To send data from an SIP to a resource within the CVN, a baseline packet may first be generated, comprising the data produced by the SIP in its payload. The data may for example comprise a query generated by an SIP 172 for data stored at a data source 162 as part of the SIP's implementation of the business logic of S1. The baseline packet's destination address may be set to an address of a resource (such as a CI 160A or a DS 162A) in the CVN, or an address of a CPNR 133A, and the source address may be set to the address of the SIR. An encapsulation packet may then be constructed, e.g., by networking manager data plane components, comprising at least a portion of the baseline packet as the packet payload. The destination address of the encapsulation packet may be set to the address of the SVG (or an address specific to the communication channel), so that the encapsulation packet can be received at the SVG.

When such a packet is received, e.g., at the networking manager's packet processing service nodes which implement the SVG, data plane logic of the networking manager may be executed to determine how to dispose of the packet. The mapping between the channel and the CLE may be identified, enabling the networking manager logic to determine which specific CLE is involved in the transmission. If the security settings 157 chosen by the consumer-side VCS client C2 permit the transmission of data via the CLE 160 to the destination (such as a CI 160A or a DS 162A) indicated in the encapsulated packet (the baseline packet), a transformed version of the baseline packet may be generated and sent to the destination. The payload of the transformed version may comprise the payload of the baseline packet, while the source address may be set to the address of the CLE. To the recipient (e.g., a CI 160A or a DS 162A), it may thus appear that the packet originated within the CVN, and not at some service external to the CVN. If a response to the transformed version of the packet is required (e.g., if the payload of the packet comprises a query to which a response can be generated at the recipient), the response may be sent with the CLE as the destination address. The networking manager may then perform a reverse translation of the destination address, creating a transformed response version with the destination address set to the address of the SIR, and cause the transformed response version to be sent to the SIR. PVN-initiated packet flows of the kind discussed above, together with response flows in the reverse direction, may be referred to collectively as PVN-to-CVN packet flows herein.

A similar approach to that outlined above for packets sent from S1 SIRs to CVN resources of subset 155 may be taken with respect to packets originating at the SIRs and directed to CPNRs 133A. One difference would be that such messages may be sent via the CLE and the CCI from the CVN to the CPNRs: that is, the CCI may also be required to process the traffic, just as it is required to process traffic generated from resources within the CVN and directed to the external consumer premise network. Responses may also be handled with the help of the CCI and the CLE.

The security settings 157 chosen by the consumer-side client C2 may enable C2 to have fine-grained control over which subsets of resources within the CVN can be accessed from S1 implementation resources in the depicted embodiment. The security settings 176 chosen by the provider-side client C1 may enable C1 to also restrict the set of resources within the PVN that can access resources in the CVN.

FIG. 2 illustrates examples of services, implemented at service provider virtual networks, which may require network access to at least some portions of service consumer virtual networks, according to at least some embodiments. Example services 210 which may need to initiate packet flows to CVNs access for performing service tasks may include, among others, server-less automatically-triggered function execution services 230, scalable container-based application implementation services 240, remote resource health monitoring/administration services 250, resource usage tracking services 260, auto-scaled multi-tenant application service 270, as well as auto-scaled single-tenant application services 280.

A consumer or client of a server-less automatically triggered function execution service 230 may define a function which is to be executed using resources selected by the service (without requiring the client to acquire or specify the resources), and the triggering conditions for executing the functions. In some cases, the execution of the function may require access to data stored within a CVN. Such data may be retrieved by initiating PVN-to-CVN packet flows of the kind discussed above, using an SVG and a CLE. In other cases, CVN resources may need to be accessed to determine whether the function triggering conditions are met, and/or to provide results of the functions.

A consumer of a scalable container-based application implementation service 240 may provide an indication of one or more software containers that are to be executed for an application, with the resources used for executing the containers being selected by the service provider. As the workload level of the application increases, the service provider may assign more resources within a PVN for the containers, relieving the client of responsibility for managing scale-up of resources. If the programs running in the containers require access to data or other resources within the CVN, PVN-to-CVN packet flows of the kind introduced above may be employed.

A remote resource health monitoring service 250 may perform administrative tasks at CVN resources and may therefore also need support for PVN-to-CVN packet flows. The payloads of the packets sent to the CVN may for example comprise health checking queries or tests, and the responses (from compute instances and/or data sources) may indicate the status of the targeted CVN resources.

Resource usage tracking services 260 may require access to logs or measurements maintained at CVN resources and may therefore also utilize PVN-to-CVN packet flows. In some cases, such services may need to track very short-lived or ephemeral events, such as the startup and quick subsequent shutdown of virtual machines, and tracking such ephemeral events may require access to logs of network address assignment managers within the CVN (for example, each such short-lived virtual machine may be assigned a network address, so records of such address assignments may be used to infer that the virtual machines were launched).

Some consumers may simply wish to hand over responsibilities for scaling certain applications, which may be single-tenant or multi-tenant, to service providers. As and when the workload levels of such applications change, the providers of auto-scaled multi-tenant application services 270 or auto-scaled single-tenant application services 280 may be responsible for choosing the appropriate resources for executing the applications. If the applications require access to data at CVNs, PVN-to-CVN packet flows may be used. Other types of applications than those shown in FIG.

2 may also benefit from the use of SVGs and CLEs for PVN-to-CVN packet flows in at least some embodiments.

FIG. 3 is a flow diagram illustrating aspects of operations of a server-less automatically triggered function execution service which may require access to consumer-side virtual networks, according to at least some embodiments. As shown in element 301, a consumer of such a service may define a server-less function, sometimes referred to as a lambda function, and the conditions that are to trigger execution of such a function by the service. The definition and triggering condition may be saved at a repository of the service.

An event detector of the service provider, running for example within a PVN, may determine that the triggering condition has been satisfied (element 305). In some cases, the triggering condition may be as simple as the completion of a specified time interval since the last time that the function was executed; in other cases, more complex triggering conditions (such as the successful completion of some other function) may be detected.

At a PVN being used for the service, a function execution resource FER may be identified (element 310). The FER (such as a VCS compute instance) may be chosen without any guidance about resource selection by the consumer, and without requiring the consumer to acquire or specify any particular resource or type of resource in some embodiments. The execution of the function may then be initiated at the FER (element 315), e.g., by an SIR of the service.

To complete execution of the function, in at least some cases data may be needed from a consumer-side data source at a CVN (element 325). This may require the establishment of secure connectivity for a packet flow initiated from the PVN to the CVN, using techniques similar to those described above. It may also be the case that results of the function may have to be sent from the PVN to some destination within the CVN, which may also require PVN-initiated packet transmission. In one embodiment, the detection of the triggering condition may itself require access to resources or data within the CVN, also necessitating PVN-to-CVN packet flows.

Figure 4:
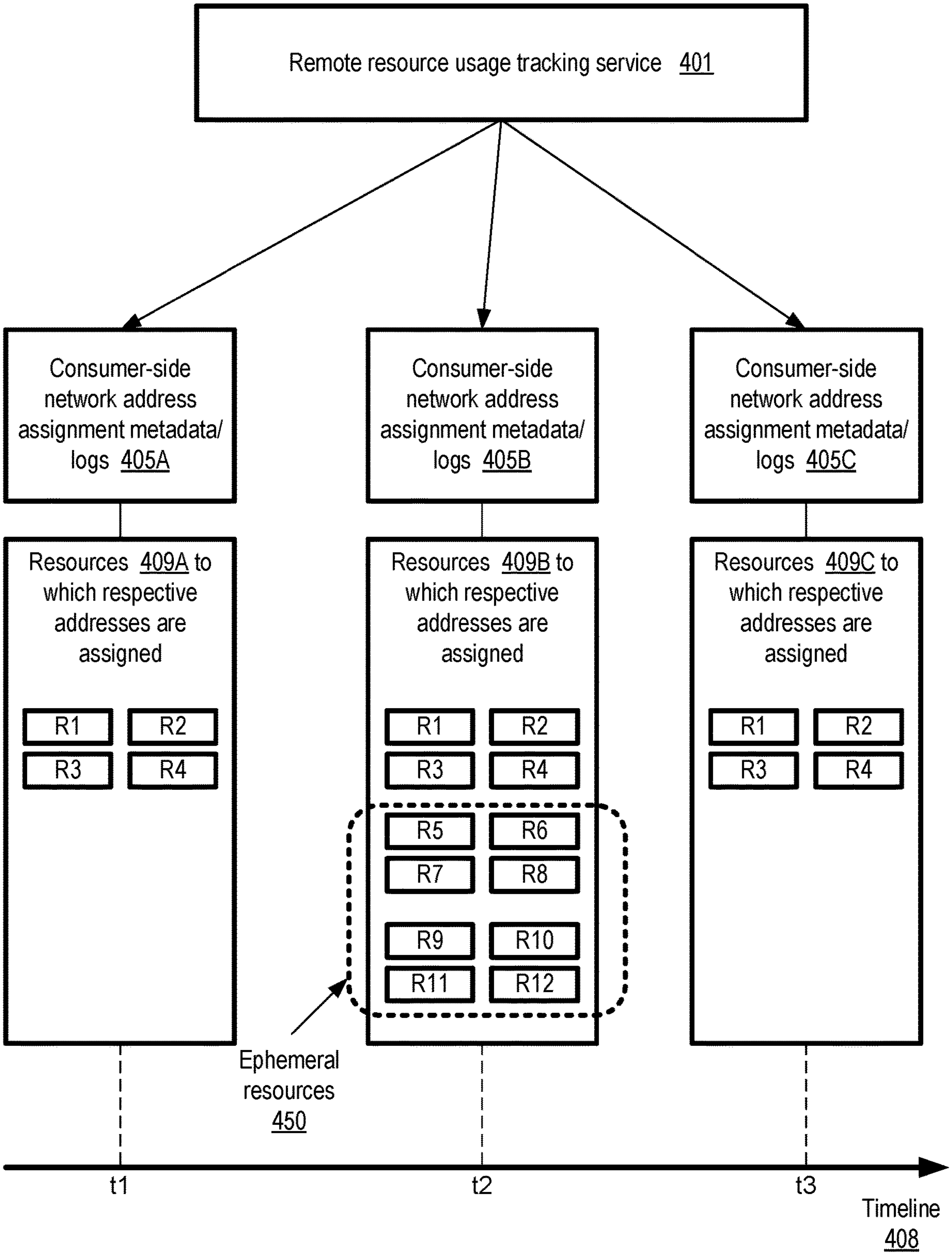
FIG. 4 illustrates an example scenario in which a remote resource usage tracking service may need to access data at a service consumer virtual network, according to at least some embodiments.

FIG. 4 illustrates an example scenario in which a remote resource usage tracking service may need to access configuration data at a service consumer virtual network, according to at least some embodiments. In the depicted scenario, respective network addresses may be assigned to each resource of a dynamically changing set of resources within a CVN, such as compute instances or virtual machines which are launched, used for some time, and then terminated in some cases. Timeline 408 shows three points in time, at which respective sets of such dynamic resources may be online at the CVN.

At time t1 along timeline 408, resources 409A to which respective addresses are assigned may include resources R1, R2, R3 and R4. At time t2, a set of ephemeral resources 450, which include resources R5, R6, R7, R8, R9, R10, R11, and R12, may also have respective network address assigned to them. The resources R1, R2, R3 and R4 may remain online as well within the set of resources 409B to which addresses happen to be assigned at time t2. At time t3, the only remaining resources in the currently online set of resources 409C may comprise R1, R2, R3 and R4, as the ephemeral resources may no longer be online.

Because the ephemeral resources may have fairly short lifetimes, it may not be straightforward for the remote resource usage tracking service 401, which is implemented at a PVN, to be able to detect the existence of the ephemeral resources while those resources are online. Instead, the service 401 may rely on longer-lasting consumer-side network address assignment metadata or logs, such as 405A, 405B or 405C to determine which resources were online over various time frames. The metadata or logs may be maintained for substantially longer time periods than the lifetimes of some of the resources whose address assignments are recorded in the metadata or logs. In order to access such metadata/logs, PVN-to-CVN packet flows of the kind discussed above may be employed in at least some embodiments.

FIG. 5 illustrates an example establishment of a network tunnel between a service implementation resource and a virtual gateway within a service provider virtual network to enable the service implementation resource to transmit messages to a consumer-side resource within a service consumer virtual network, according to at least some embodiments. In the depicted scenario, a service implementation resource (SIR) 562 has been assigned an IP address L within a PVN private address range PPAR of a PVN 551. To implement the service, the SIR needs to initiate packet flows directed to a consumer-side target resource 505 within a CVN 501.

To facilitate such packet flows while ensuring that security requirements of both the CVN and the PVN are satisfied, an SVG 522 has been configured in PVN 551, e.g., in response to a request sent using VCS programmatic interfaces by the owner of the PVN. SVG 522 has been assigned an IP address K within PPAR.

At the request of the VCS client that owns CVN 501, a CLE 509 has been configured in the CVN. The CLE is assigned an IP address A within the CVN's private address range CPAR. The consumer-side target resource (CTR) 505 has been assigned an IP address B within CPAR.

After a multi-stage workflow in which both the CVN owner and the PVN owner agree that connectivity between the CVN and the PVN is to be established, a logical connection 590 has been created, linking the CLE with the SVG. A virtual connection identifier (VCI) indicative of the logical connection may be created by a networking manager of the VCS and provided to the owner of the PVN. This VCI may then be used (e.g., supplied a s parameter in a command) to establish a tunnel 555 linking the SIR 562 to the SVG 522. The security settings 512 (chosen by the owner of the PVR) may be used to determine whether the SIR 562 is permitted to use such a tunnel in some embodiments, and the tunnel may only be created if the SIR has permission. The tunnel may be used for sending encapsulated versions of baseline packets generated at the SIR, whose contents (e.g., payload portion) are to be delivered eventually to the CTR. Encapsulation may be required because the destination address (IP address B of the CTR) of the baseline packets may not be recognized as a legitimate address by the networking infrastructure of the PVN, or may otherwise be problematic from the perspective of the networking infrastructure. In some cases, for example, the CPAR may not overlap at all with the PPAR, and routing tables used within the PVN may have no entries for CPAR addresses. In other cases, the CPAR may overlap at least partially with the PPAR (recall that the CPAR and the PPAR may have been chosen independently by the owners of the CVN and the PVN respectively), which means that there may already be another resource within the PVN to which the IP address B is also assigned.

A baseline packet 533 comprising a payload P (generated by the SIR as part of the functionality of the service being implemented at the PVN) may indicate a source address L and a destination address B, indicating that the contents of the packet are to be delivered to the CTR 505. The baseline packet may be encapsulated within an encapsulation packet 535 in the depicted embodiment and sent to the SVG. The payload of the encapsulation packet may comprise at least the payload of the baseline packet. The destination address of the encapsulation packet may be set to K (the address of the SVG 522) in some embodiments. In other embodiments, the destination address may be set to an address assigned specifically to the tunnel 555.

After the encapsulation packet is received at the SVG via the tunnel (e.g., at packet processing nodes implementing the SVG), a mapping between the tunnel and the CLE 509 (stored by a VCS networking manager when the tunnel was created) may be looked up to determine how to proceed with processing of the encapsulation packet in the depicted embodiment. Having found the mapping and having verified that security settings 511 of the CLE allow transmission of packets from the CLE to the CTR 505, the networking manager may cause a transformed version 534 of the baseline packet to be delivered to the CTR in the depicted embodiment. The payload P of the baseline packet may be included in the transformed packet 534, and the destination address may be set to B, but the source address may be set to A. As such, to the consumer-side resource 505, a packet whose contents actually originated in the PVN may appear to have originated in the CVN itself.

Figure 6:
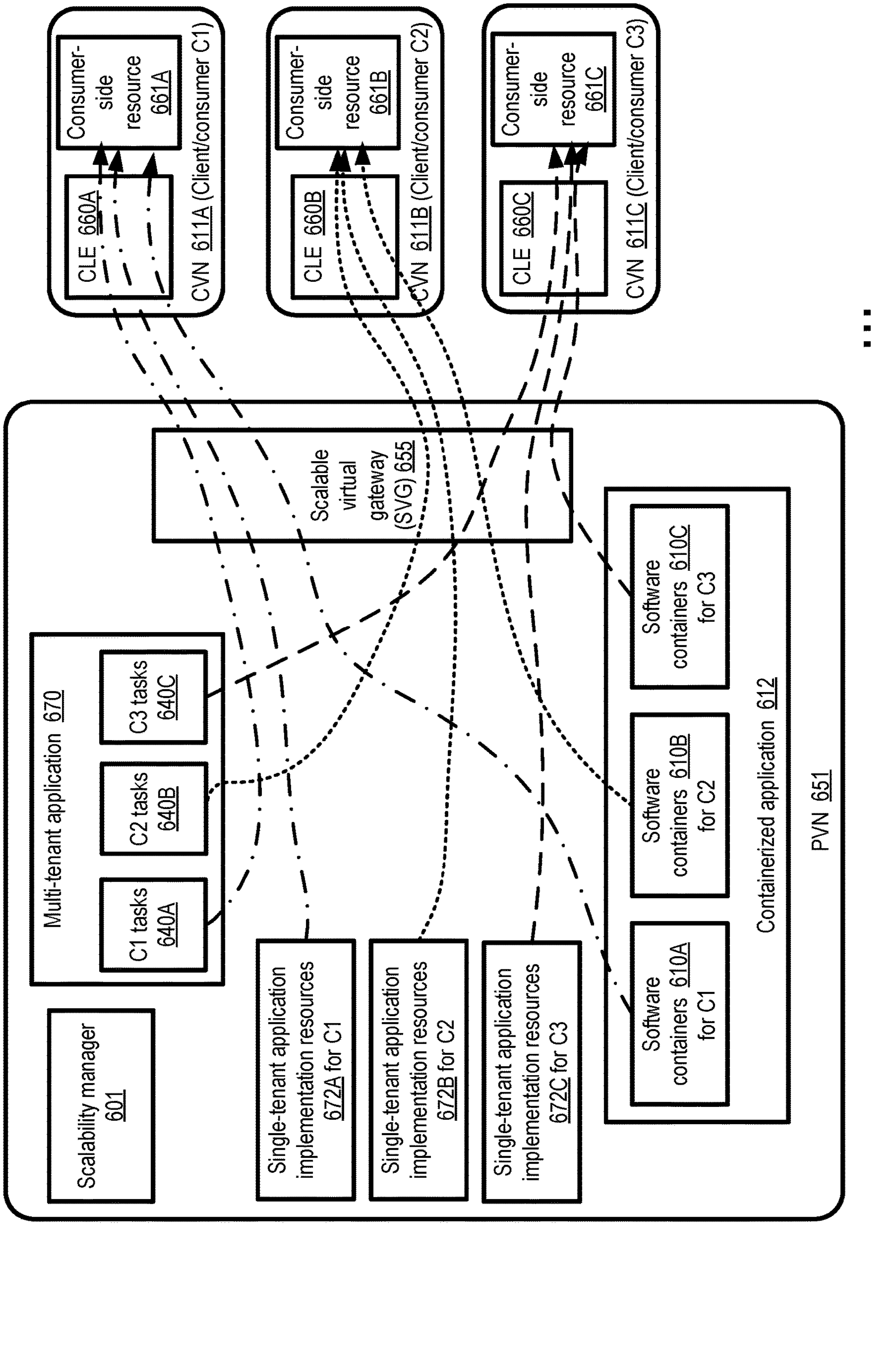
FIG. 6 illustrates an example use of a virtual gateway for traffic directed to multiple consumer virtual networks from services of several categories that may be implemented within a service provider virtual network, according to at least some embodiments.

FIG. 6 illustrates an example use of a virtual gateway for traffic directed to multiple consumer virtual networks from services of several categories that may be implemented within a service provider virtual network, according to at least some embodiments. By way of example, three types of applications (which may each be implemented using a separate service defined and registered by the same service provider) are shown as being executed within a PVN 651 on behalf of service consumers. A multi-tenant application 670 may be implemented within one of the resources (e.g., a compute instance) of PVN 651, with respective sets of tasks or operations being performed on behalf of three clients or consumers of an auto-scaled multi-tenant application service of the PVN. C1 tasks 640A may be performed on behalf of a client/consumer C1 and may require access to consumer-side resource 661A in a CVN 611A of C1. C2 tasks 640B may be performed on behalf of a client/consumer C2 and may require access to consumer-side resource 661B in a CVN 611B of C2. C3 tasks 640C may be performed on behalf of a client/consumer C3 and may require access to consumer-side resource 661C in a CVN 611C of C3. The consumers C1, C2 and C3 may have established respective CLEs in their CVNs: CLE 660A in CVN 611A, CLE 660B in CVN 611B, and CLE 660C in CVN 611C. An SVG 655 may have been set up at the request of the service provider within PVN 651.

At a containerized application 612 being implemented as part of a containerized application management service of PVN 651, software containers 610A may be executed on behalf of consumer C1, software containers 610B may be executed on behalf of consumer C2, and software containers 610C may be executed on behalf of consumer C3. Some of the operations executed within a given container may require access to consumer-side resources such as resource 661A in the case of containers 610A, resource 661B in the case of containers 610B, or resource 661C in the case of containers 610C.

As part of a single-tenant application management service of PVN 651, respective applications may be run at single-tenant application implementation resources 672A for consumer C1, single-tenant application implementation resources 672B for consumer C2, and single-tenant application implementation resources 672C for consumer C3 in the depicted embodiment. Some of the operations executed within a given single-tenant application may require access to consumer-side resources such as resource 661A 661B or 661C.

PVN-to-CVN packet flows may be transmitted via the SVN and the CLEs, e.g., using the CLEs and secure tunnels/channels between the service implementation resources of the various services and the SVG, to access the consumer-side resources from the PVN for the different services. Each PVN-to-CVN flow may be kept isolated with respect to the other PVN-to-CVN flows using the secure channels and the encapsulation and address modification techniques described above. In at least some embodiments, packet processing nodes which form the SVG may maintain flow state tracking information which can be used to determine which flow a packet transmitted in the CVN-to-PVN direction (e.g., a response to a packet sent via the SVG to the CVN earlier) belongs, so that the packet can be sent to the correct PVN resource. In some embodiments, a service provider who is implementing several services within a given PVN may set up a respective SVG for the PVB-to-CVN traffic of each of the services, instead of using a single SVG as shown in FIG. 6.

A scalability manager 601 of the PVN may be responsible for modifying the set of resources allocated for the PVN's services and the SVG as needed in the depicted embodiment. For example, more packet processing nodes may be added to the SVG as traffic increases, compute instances with greater computational capabilities may be added (or workloads may be moved to such compute instances) as the utilization of the current set of compute instances being used for a given service increases, and so on.

Figure 7:
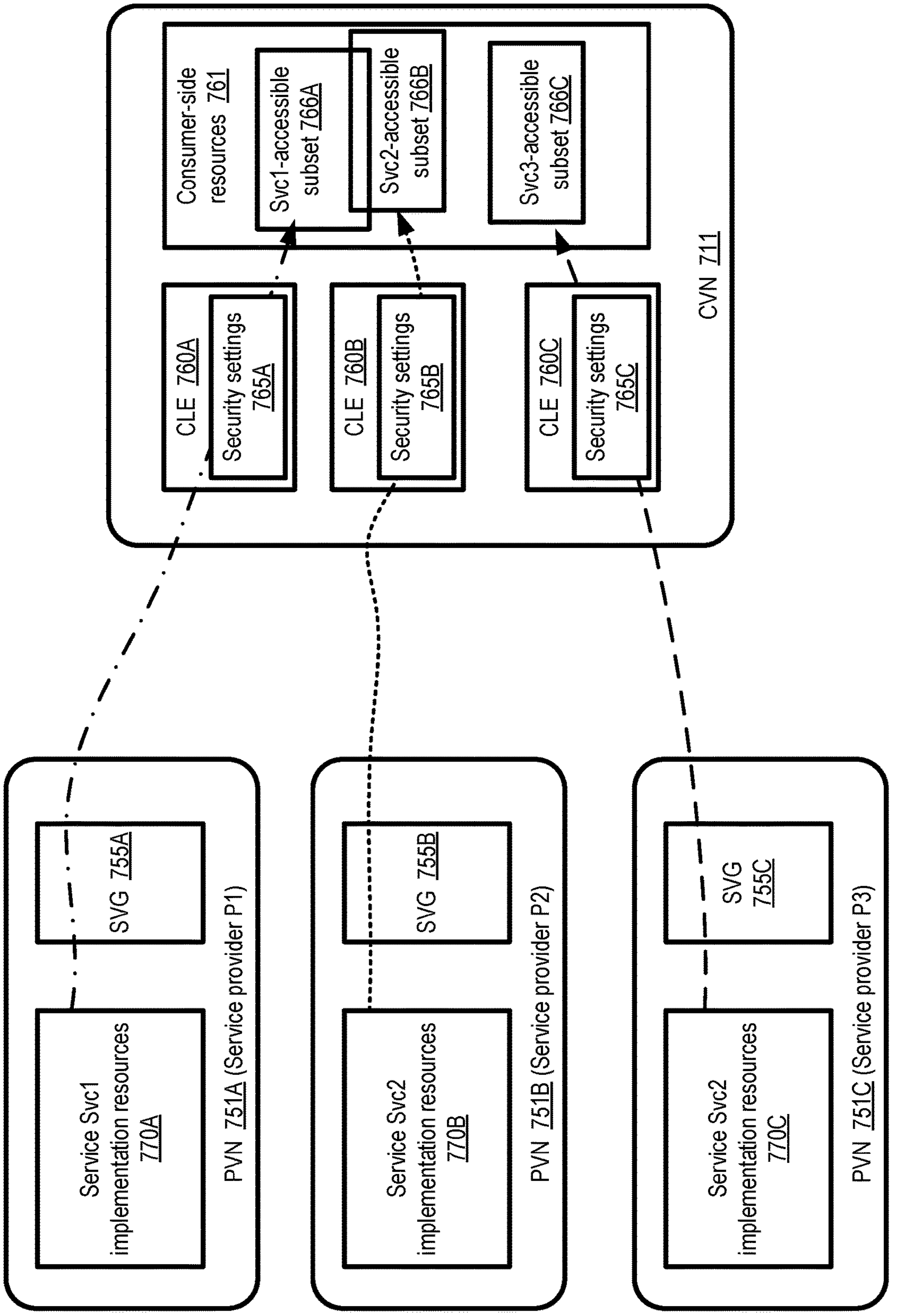
FIG. 7 illustrates an example scenario in which multiple client-side limited-access endpoints may be set up within a consumer virtual network, according to at least some embodiments.

FIG. 7 illustrates an example scenario in which multiple client-side limited-access endpoints may be set up within a consumer virtual network, according to at least some embodiments. An owner or administrator of a CVN 711 may wish to utilize multiple services Svc1 Svc2 and Svc3 being implemented by respective service providers in the example scenario. Svc1 may be implemented using implementation resources 770A in PVN 751A of service provider P1. Svc2 may be implemented using implementation resources 770B in PVN 751B of service provider P2, while Svc3 may be implemented using implementation resources 770C in PVN 751C of service provider P3. The service implementation resources 770A may require access to one subset of consumer-side resources 761, labeled Svc1-accessible subset 766A. Service implementation resources 770B may require access to another subset of consumer-side resources 761, labeled Svc2-accessible subset 766B. Similarly, service implementation resources 770C may require access to a third subset of consumer-side resources 761, labeled Svc3-accessible subset 766C. Note that the subsets may overlap in some cases—e.g., Svc1 and Svc2 may require access to some of the same resources in the depicted example.

To enable consumer-controlled access to the subsets of the consumer-side resources, three CLEs with respective security settings may be established in CVN 711. CLE 760A with security settings 765A may be set up to provide access from PVN 751A, CLE 760B with security settings 765B may be set up to provide access from PVN 751B, and CLE 760C with security settings 765C may be set up to provide access from PVN 751C. Defining separate security settings for each CLE may enable the administrator of the CVN 711 to simplify the management of access from remote services. In each of the PVNs, a respective SVG may be set up at the request of the service provider for handling PVN-to-CVN packet flows. For example, SVG 755A, SVG 755B and SVG 755C may be established in PVN 751A, PVN 751B and PVN 751C respectively. Note that if desired by the administrator of CVN 711, a single CLE may be shared for the PVN-to-CVN flows from multiple PVNs in some embodiments. As such, it may not be necessary to set up a separate CLE for each PVN or each service provider's service in such embodiments. A common collection of security settings may be defined in such cases, with respective security rules being defined for each PVN.

FIG. 8 illustrates examples of consumer-side and provider-side security settings pertaining to network traffic flows which originate at service provider networks and are directed to destinations within service consumer networks, according to at least some embodiments. At least two types of consumer-side security settings 830 may be selected or defined by a service consumer (e.g., an owner or administrator of a CVN). Network access settings 840 may for example comprise the equivalent of firewall rules, security groups and/or network access control lists (NACLs) in the depicted embodiment. Each such setting may for example restrict the set of sources from which packets can be received at a given consumer-side resource such as a compute instance or a CLE, and/or the set of destinations to which packets can be sent from the consumer-side resource. Functionality constraints 842 may indicate the types of actions, operations or functions which can be performed (and/or which types of actions, operations or functions are prohibited) by a provider-side resource at a consumer-side resource to which access has been granted via network access settings 840. In some embodiments, the cloud computing environment may include an identity management service at which roles or capabilities for various entities are defined. The functionality constraints 842 may be specified by the service consumer using such roles or capabilities—e.g., the consumer may indicate that provider-side resources that have been granted role Role1 or capability set Cap1 can access a particular consumer-side resource and perform any actions that are permitted to Role1 or Cap1. In embodiments in which functionality constraints 842 are specified, components of the VCS or its networking managers (such as agents running at the CVN resources to which packets are sent from the PVN) may verify that the operations being attempted via packets sent from the PVN are permitted by the functionality constraints. If such an operation is not permitted by the constraints, the operation may be rejected in such embodiments.

Several types of provider-side security settings 850 may be selected or defined with respect to PVN-to-CVN packet flows in the depicted embodiment. Gateway access settings 860 may indicate a subset of service implementation resources that are permitted to establish secure channels or tunnels to an SVG. For example, a PVN may comprise dozens or hundreds of compute instances collectively implementing a service, with various groups of compute instances implementing different parts of the service, and only a subset of those compute instances may need access to consumer-side resources. The gateway access settings may prevent any of the other resources from accessing the SVG via tunnels, and hence from accessing resources in a CVN. A max-CLE-connected limit 862 setting may restrict a given SVG to establishing logical connections to no more than a selected number of CLEs concurrently, thereby also limiting the impact of failures and/or successful attacks on the SVG. For example, if the max-CLE-connected limit is set to 12, at most 12 CVNs would be impacted if there were a successful attack on the SVG, or if the SVG happened to fail. A number of approaches to protecting tunnel identifiers may be taken using tunnel ID protection settings 864 in some embodiments. A tunnel identifier may be selected at random from some range (e.g., 0 to (231−1) if 32 bits are used), and the identifier may be required to be supplied when submitting from a service implementation resource to a CVN. If the CVN is guessed correctly by an attacker that has also gained access to a resource in the PVN, it may become possible for that attacker to start sending unwanted packets to CVN resources. Some attackers may attempt to guess a tunnel ID by trying incorrect tunnel IDs until they eventually find a valid tunnel ID. In at least one embodiment, based on a tunnel ID protection setting chosen by the service provider, only a specified number of incorrect tunnel ID use attempts may be permitted from a resource before that resource is prevented from trying any additional tunnel IDs. Similarly, settings 864 may be used to choose a large size (in terms of the number of bits used) for tunnel IDs, making guessing of valid tunnel IDs harder in some embodiments. In at least one embodiment, a secrets management service of the cloud computing environment may be used to further secure PVN-to-CVN communications. Such a service may require the use of cryptographic keys (generated at the request of the service provider) to create or access tunnels, allow tunnels to be used for no more than a specified maximum duration before their tunnel IDs expire and have to be refreshed or rotated, and so on. Other types of security settings may be supported by the VCS at the consumer side and/or the provider side of PVN-to-CVN communications in some embodiments than those shown in FIG. 8**.

Figure 9:
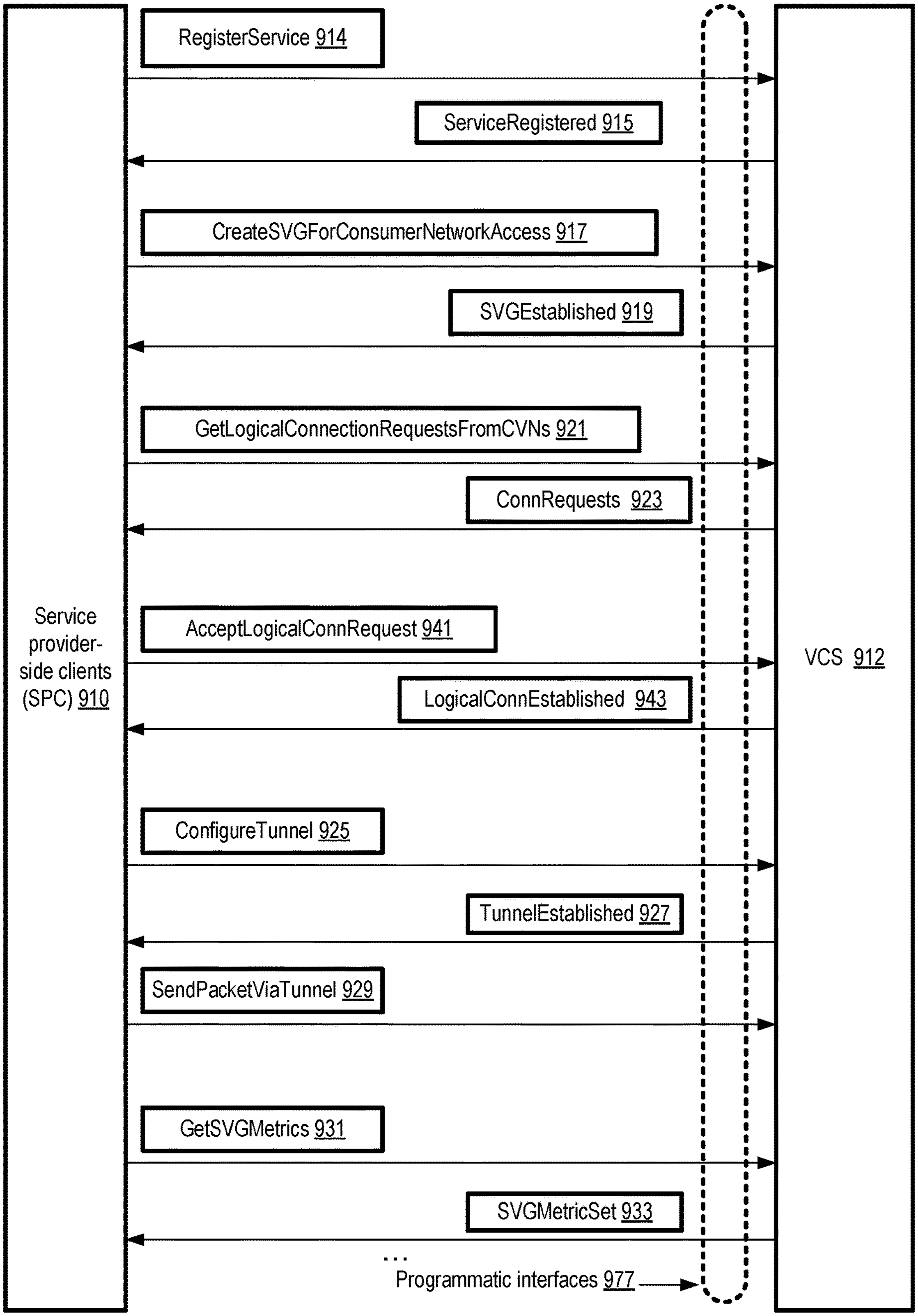
FIG. 9 illustrates example programmatic interactions, pertaining to the management of network traffic from service provider networks to service consumer networks, between service provider-side clients and a virtualized computing service of a cloud computing environment, according to at least some embodiments.

FIG. 9 illustrates example programmatic interactions, pertaining to the management of network traffic from service provider networks to service consumer networks, between service provider-side clients and a virtualized computing service of a cloud computing environment, according to at least some embodiments. A VCS 912, similar in features and functionality to VCS 105 of FIG. 1, may implement a set of programmatic interfaces 977 in the depicted embodiment, such as one or more web-based consoles, command-line tools, graphical user interfaces and/or APIs. Service provider-side clients (SPC) 910 (e.g., owners/administrators of various PVNs) may utilize the programmatic interfaces to submit requests and information pertaining to their services and to PVN-to-CVN packet flows in various embodiments and receive corresponding responses. An SPC may submit a RegisterService request 914 via the programmatic interfaces 977, comprising a descriptor of the functionality of a proposed service which may be implemented at a PVN, and providing a name for the service. If the description satisfies registration criteria of the VCS, the service may be accepted and added to a list of available services in a registry, and a ServiceRegistered message 915 may be sent to the SPC in the depicted embodiment.

An SPC may request the establishment of an SVG for a particular service by submitting a CreateSVGForConsumerNetworkAccess request 917 in various embodiments. In at least some embodiments, parameters of such a request may indicate the names or identifiers of the services for which the SVG is intended to be used, and/or security settings for the SVG (similar to some or all of the provider-side security settings shown in FIG. 8). Control plane components of the VCS may allocate resources for implementing the SVG (e.g., a set of packet processing nodes may be assigned to the SVG, each implemented using a respective compute instance), generate an identifier of the SVG, assign a network address within a specified PVN to the SVG, and send an SVGEstablished message 919 to the SPC in various embodiments. Note that in some embodiments, SPCs may submit or update security settings pertaining to their SVGs via separate messages to the VCS—e.g., an SVGSecuritySettings message may be sent by an SPC.

Figure 10:
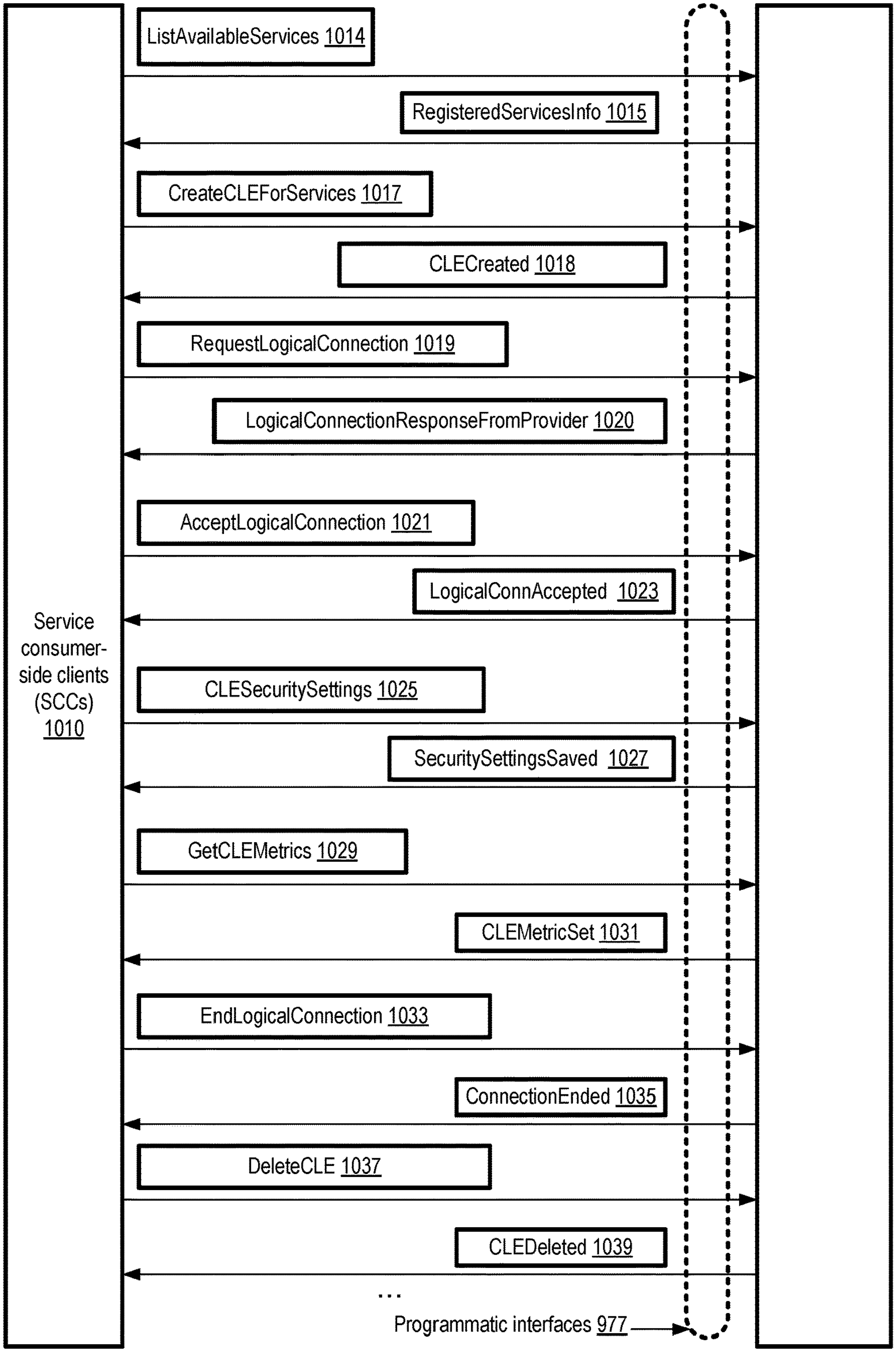
FIG. 10 illustrates example programmatic interactions, pertaining to the management of network traffic from service provider networks to service consumer networks, between service consumer-side clients and a virtualized computing service of a cloud computing environment, according to at least some embodiments.

Service consumers may query or browse a registry of services that are implemented at PVNs, and request the creation of a CLE which is to be used to allow at least one such service to access resources within the service consumers' CVNs. Programmatic interactions associated with CLE creation and configuration are shown in FIG. 10. When a CLE is created at the request of a service consumer-side client, an identifier of a service (or identifiers of multiple services) for which the CLE is intended may be included in the request parameters. When such a request is received at the VCS, a networking manager of the VCS may create a request for establishment of a logical connection between the CLE and a corresponding SVG, and store it in a queue of such requests maintained for SPCs in some embodiments. An SPC may determine which (if any) clients would like to establish logical connections between their CLEs and an SVG by submitting a GetLogicalConnectionRequestsFromCVNs request 921 to the VCS. If there are any outstanding requests for logical connection establishment, such requests may be indicated by the VCS in a ConnRequests message 923 in some embodiments. The SP may then decide, for any one of the outstanding requests, whether the request should be accepted or not. If the SPC decides that the request should be accepted (e.g., if the service provider decides that the consumer that requested the logical connection is acceptable as a client of the service), an AcceptLogicalConnRequest message 941 may be sent to the VCS. The logical connection may be established, and a LogicalConnEstablished message 943 may be sent to the SPC in some embodiments. In at least some embodiments, a virtual connection identifier (VCI) representing the CLE with which the logical connection is established may be provided in the LogicalConnEstablished message 943. In one embodiment, a service provider may inform the VCS that at least some number of logical connection establishment requests with respect to a given SVG are to be approved automatically, without requiring separate approval messages from the service provider; accordingly, messages such as GetLogicalConnectionRequestsFromCVNs and AcceptLogicalConnRequest may not be required in such an embodiment. In another embodiment, a service provider may inform the VCS that at least some number of logical connection establishment requests with respect to a given SVG are to be sent automatically to the service provider, instead of requiring the service provider to send GetLogicalConnectionRequestsFromCVNs messages.

A secure channel or tunnel between a service implementation resource (SIR) and an SVG may be established in response to a ConfigureTunnel request 925 in the depicted embodiment. A TunnelEstablished response message, containing a tunnel identifier 927, may be sent to the SPC in some embodiments. In some embodiments, the ConfigureTunnel request may be submitted by a program running at the SIR. When a packet is to be sent from the SIR to an address within the CVN via the SVG and the CLE, a SendPacketViaTunnel request 929 may be submitted in some embodiments. In at least one embodiment, components of the networking manager of the VCS (such as networking virtualization managers running at the host at which the SIR runs) may generate an encapsulation packet which comprises the original packet which is to be sent to the CVN, and send the encapsulation packet to the address of the SVG within the PVN. As described earlier, the contents of the encapsulation packet may be extracted and transformed by networking manager components of the VCS and sent to the target destination within the CVN, making it appear as though the packet originated in the CVN itself.

In the embodiment depicted in FIG. 9, an SPC may request metrics of various types, pertaining to a specified SVG, by submitting a GetSVGMetrics request 931 via programmatic interfaces 977. A variety of metrics may be collected by networking managers, on a per-CLE and on a per-SVG level in some embodiments and provided to the SPC via one or more SVGMetricSet messages 933. For example, for a given CLE to which a logical connection is established from an SVG, the metrics may include the number of active packet flows underway via respective secure tunnels/channels, the number or rate of bytes sent via the CLE to one or more targets within a CVN, the number or rate of bytes sent in response from the targets within the CVN to the PVN, the number of errors encountered by packet flows directed to the CVN from the PVN of the SVG, the number of packets dropped, the number or rate of packets sent via the CLE to one or more targets within a CVN, the number or rate of packets sent in response from the targets within the CVN to the PVN, and the like. With respect to a given SVG, which may have logical connections established to multiple CLEs, such metrics may be provided at the per-CLE granularity or aggregated across multiple CLEs. In addition, in at least some embodiments, a metric of the number of CLEs that are connected concurrently via a given SVG, a metric of the number of times attempts to create tunnels/channels from SIRs were attempted, a number of times such attempts failed due to the use of an invalid parameters such as an invalid virtual connection identifier (VCI) or an unauthorized entity submitting the attempt, a metric of the number of times attempts to send packets via the secure channels from SIRs were attempted, a number of times such attempts failed due to the use of an invalid tunnel identifier etc. may be provided. If the number of attempts to create tunnels using invalid VCIs or to send packets using invalid tunnel identifiers is high, this may indicate that some unauthorized entity is attempting to access the CVN and may be interpreted as a potential security threat in some embodiments.

FIG. 10 illustrates example programmatic interactions, pertaining to the management of network traffic from service provider networks to service consumer networks, between service consumer-side clients and a virtualized computing service of a cloud computing environment, according to at least some embodiments. A service consumer-side client (SCC) 1010, such as the owner or administrator of a CVN that wishes to utilize one or more services implemented within the cloud computing environment by third parties, may submit a ListAvailableServices request 1014 via programmatic interfaces 977 to the VCS 912 in some embodiments. Information about the services that have been registered may be provided via one or more RegisteredServicesInfo messages 1015.

The SCC may then choose one or more registered services if desired, and submit a request for the establishment of a CLE in the CVN, in the form of a CreateCLEForServices message 1017 which specifies the service(s) and the CVN. In some cases, the CreateCLEForServices request may also indicate security settings of the CLE with respect to the packets received from the PVN via the CLE from individual ones of the services specified. The CLE may be created at the VCS and assigned a network address within the CVN in various embodiments. A CLECreated message 1018 may be sent to the SCC in some embodiments. In one embodiment, as soon as a CLE is created, the service provider may be notified that the SCC has requested a logical connection, or a message indicating that the SCC has requested a logical connection may be queued for the service provider. In other embodiments, the SCC may submit a separate RequestLogicalConnection message 1019 indicating that the service provider should initiate a logical connection using a specified CLE. The service provider's response to the indication that the SCC has requested a logical connection may be provided via a LogicalConnectionResponseFromProvider message 1020 in the depicted embodiment. Note that if desired, the service provider may decide not to provide the service to a given SCC or CVN, and reject the request for logical connection establishment. In some embodiments, the response from the provider may be queued for the SCC instead of being sent synchronously.

In some embodiments, after a service provider approves establishment of a logical connection with a CLE, the SCC may have another opportunity to accept or reject the logical connection. If the SCC decides that the logical connection is acceptable, an AcceptLogicalConnection message 1021 may be sent to the VCS in such an embodiment; otherwise, the SCC may send a rejection of the logical connection. The VCS may send a LogicalConnAccepted response message 1023 in some embodiments to acknowledge the acceptance of the logical connection by the SCC.

An SCC may submit a CLESecuritySettings message 1025 to specify or update the security settings (e.g., settings similar to some or all of the consumer-side security settings shown in FIG. 8) of a particular CLE in the depicted embodiment. The security settings may be saved in a repository of the VCS, and a SecuritySettingsSaved message 1027 may be sent to the SCC.

In the embodiment depicted in FIG. 10, an SPC may request metrics of various types, pertaining to a specified CLE, by submitting a GetCLEMetrics request 1029 via programmatic interfaces 977. A variety of metrics may be collected by networking managers, on a per-CLE level as mentioned above in some embodiments, and provided to the SCC via one or more CLEMetricSet messages 1031. For example, for a given CLE to which a logical connection is established from an SVG within a PVN, the metrics may include the number of active packet flows underway, the number or rate of bytes sent via the CLE to one or more targets within the corresponding CVN, the number or rate of bytes sent in response from the targets within the CVN to the PVN, the number of errors encountered by packet flows directed to the CVN via the CLE, the number of packets dropped, the number or rate of packets sent via the CLE to one or more targets within a CVN, the number or rate of packets sent in response from the targets within the CVN to the PVN, and the like.

An SCC that has earlier approved establishment of a logical connection with respect to a given CLE may cause the logical connection to be terminated by sending an EndLogicalConnection request 1033 in the depicted embodiment. Metadata representing the connection may be deleted by a networking manager of the VCS, and a ConnectionEnded message 1035 may be sent to the SCC. The CLE itself may be retained and used for other logical connections and packet flows if desired. If the SCC wishes to delete a specified CLE (and thereby also terminate all logical connections associated with the CLE), a DeleteCLE messages 1037 may be sent to the VCS. The CLE may be deleted, and a CLEDeleted message 1039 may be sent to the client in some embodiments. In some embodiments, programmatic interactions pertaining to PVN-to-CVN connectivity, other than the interactions shown in FIG. 9 and FIG. 10, may be supported by a VCS.

FIG. 11 is a flow diagram illustrating aspects of operations, pertaining to the transmission of messages from service provider virtual networks to consumer-selected subsets of service consumer virtual networks, according to at least some embodiments. As shown in element 1101, a PVN at which a service Svc1 is implemented may be established, e.g., in response to one or more programmatic requests from a third-party service provider SP1 (a service provider that is not the operator of the VCS or cloud provider network) using a set of resources of a VCS similar in functionality and features to VCS 105 of FIG. 1. A CVN may be established using other resources of the VCS, e.g., in response to one or more programmatic requests from another customer (a service consumer) SC1 of the VCS. SP1 may choose a range of private network addresses for resources within the PVN (addresses that are not, by default, advertised or made available/accessible outside the PVN) in various embodiments. Similarly, SC1 may choose a range of private network addresses for resources within the CVN (addresses that are not, by default, advertised or made available/accessible outside the CVN) in at least some embodiments.

An SVG which can be used to transmit requests from the PVN to the CVN may be established and assigned a private network address SVGAddr within the PVN in various embodiments (element 1104), e.g., in response to a programmatic request from SP1. The SVG may be described as being scalable in that it may comprise a plurality of nodes of a packet processing service or a networking manager of the VCS, and the number of nodes may be automatically increased or decreased by the networking manager control plane components as the level of traffic being transmitted via the SVG changes. The nodes of the packet processing service may collectively perform a variety of packet processing tasks such as network address translation (NAT), encapsulation/decapsulation of packets, and the like in the depicted embodiment.

A consumer-side limited-access endpoint (CLE) may be established in the CVN and assigned a private network address within the CVN's address range (element 1107). Security settings of the CLE may be obtained at the VCS from SC1 via programmatic interfaces, indicating for example a subset of resources of the CVN to which access via the CLE is granted for packets originating at the PVN of Svc1. In at least some embodiments, the creation of the CLE may trigger a request to SP1 from the networking manager, requesting that a logical connection be established between the CLE and the SVG. If both parties (SP1 and SC1) approve, such a logical connection may be established, and a virtual connection identifier (VCI) may be created to represent the logical connection in the depicted embodiment. The VCI may be provided to SP1 and propagated to various service implementation resources (SIRs) within the PVN on various embodiments.

A secure network channel (e.g., a tunnel set up in accordance with an encapsulation protocol) may be created between a particular SIR SIRI (e.g., a virtual machine within the PVG) and the SVG in the depicted embodiment for network flows originating at the SIR and directed to a target destination within the CVG (element 1110). The VCI may be passed as a parameter in a command or request for the secure channel, issued from SIRI and processed by the networking manager of the VCS in some embodiments.

In various embodiments, a mapping M1 between the channel and the CLE may be generated and stored, e.g., in metadata accessible to the nodes of the packet processing service of the networking manager or the CVG (element 1113). An encapsulation packet which includes an encapsulated baseline packet P1 may be received at the SVG's address via the channel in the depicted embodiment after M1 has been stored (element 1116). The destination address DA1 of the baseline packet may lie within the private address range of the CVN, while the source address SAI may be the address (within the PVN's private address range) of SIR1. DA1 may have been obtained at the CVN using DHCP and/or DNS operations performed in the context of the CVN in some embodiments. The destination address of the encapsulation packet (which contains or encapsulates P1) may be set to SVGAddr in some embodiments, or to an address assigned to the channel, e.g., by a networking manager's virtualization management components in some embodiments. The data payload portion of P1 may have been generated by SIR1 to implement an operation of Svc1.

A determination may be made, using the mapping M1, that P1 is associated with the CLE (element 1119). The security settings of CLE may be consulted/examined to verify that delivery of packets via CLE to the DA1 is permitted. If such delivery is permitted, a transformed version P2 of P1 may be prepared, e.g., by components of the VCS's networking manager, and sent to DA1 (element 1122). The destination address of P2 may be set to DA1, the source address may be set to CLEAddr, and the payload may comprise at least a portion of the payload of the baseline packet P1. To the target resource within the CVN, P2 may appear to have originated within CVN. A response (if a response is required) to P2 may be sent along the reverse path—e.g., with CLEAAddr being set initially as the destination address. Based at least in part on the mapping M1, and connection records kept by the networking manager regarding the packet to which the response is being sent, the response packet may be transformed and sent on to SIRI's address by the networking manager in various embodiments.

It is noted that in various embodiments, some of the operations shown in the flow diagram of FIG. 11 may be implemented in a different order than that shown in the corresponding figure, or may be performed in parallel rather than sequentially. Additionally, some of the operations shown in the flow diagram may not be required in one or more implementations.

Figure 12:
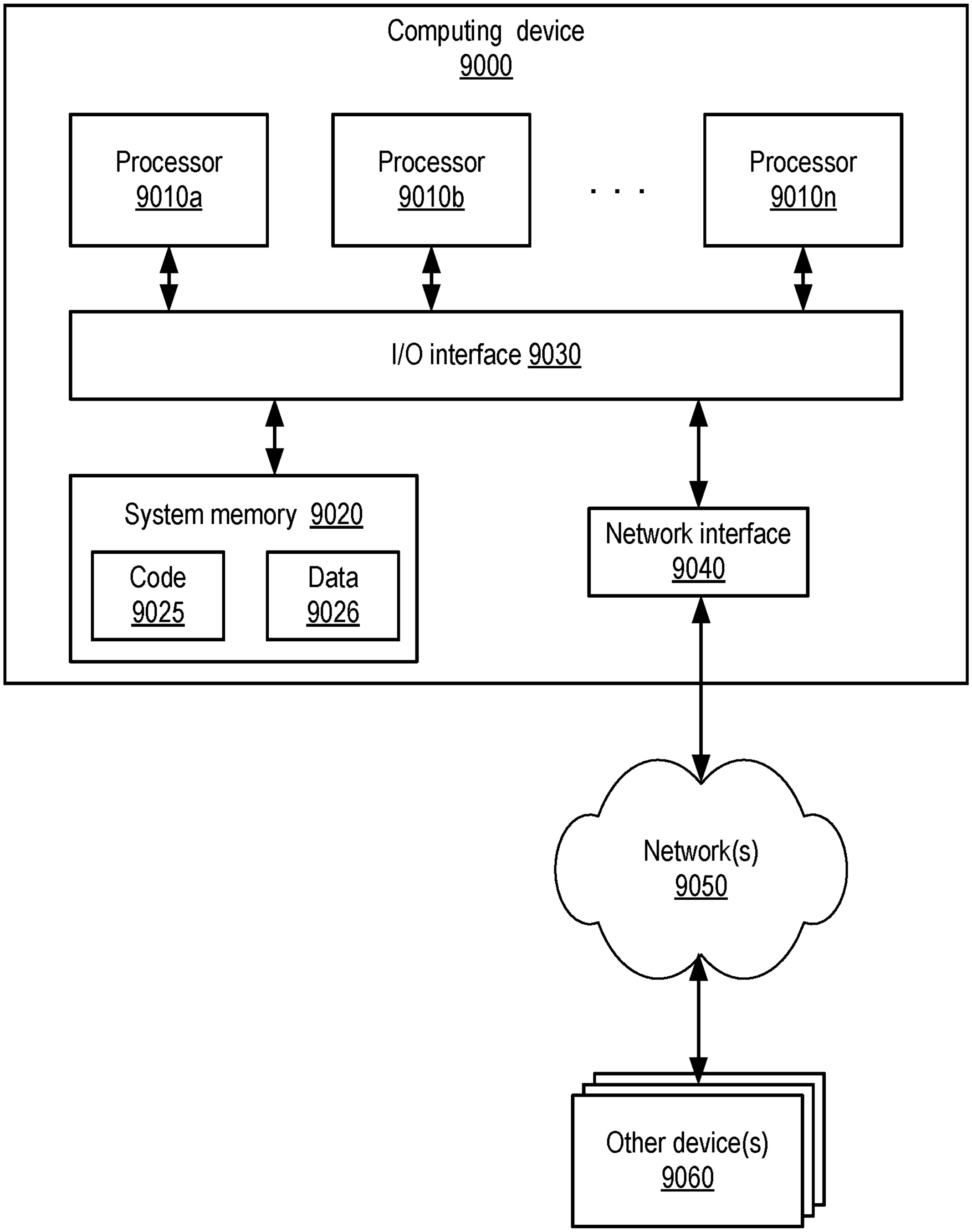
FIG. 12 is a block diagram illustrating an example computing device that may be used in at least some embodiments.

In at least some embodiments, a server that implements the types of techniques described herein (e.g., including the described functionality of VCS hosts at which compute instances, networking managers, packet processing nodes etc. are run), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a service provider virtual network in a cloud computing environment, comprising a virtual machine implementing at least a portion of a particular service that is accessible to customers of the cloud computing environment;

a service consumer virtual network, wherein the service consumer virtual network comprises a set of resources of a customer of the cloud computing environment; and a networking manager configured to:

establish a virtual gateway for transmitting packets from the service provider virtual network to the service consumer virtual network, wherein the virtual gateway is assigned a first private address not advertised within the service consumer virtual network;

establish, based on a first request from the customer including an identifier of the particular service, a consumer-side limited-access endpoint in the service consumer virtual network to enable packet flows originating at the particular service to be delivered to a first subset of resources of the service consumer virtual network, wherein the consumer-side limited-access endpoint is assigned a second private address not advertised within the service provider virtual network, wherein security settings of the consumer-side limited-access endpoint prevent transmission of network packets via the consumer-side limited-access endpoint to a second subset of resources of the service consumer virtual network;

store a mapping between (a) an encapsulation protocol tunnel connecting the virtual machine and the virtual gateway and (b) the consumer-side limited-access endpoint;

receive, at the virtual gateway via the encapsulation protocol tunnel, a baseline packet originating at the virtual machine and addressed to an address of a particular consumer-side resource within the first subset of resources, wherein a data payload of the baseline packet is generated at the virtual machine to implement an operation of the particular service, determine, using the mapping, that the baseline packet is associated with the consumer-side limited-access endpoint;

verify that the security settings permit delivery of data to the particular consumer-side resource;

prepare a transformed version of the baseline packet with the second private address as source, wherein a data payload of the transformed version comprises the data payload of the baseline packet; and deliver the transformed version to the particular consumer-side resource.

2. The system as recited in claim 1, wherein the networking manager is further configured to:

cause, based at least in part on receiving the first request, a second request to initiate a logical connection between the particular service and the consumer-side limited-access endpoint to be obtained by a particular service provider on whose behalf the service provider virtual network was established, wherein the second request includes an indication of the consumer-side limited-access endpoint.

3. The system as recited in claim 2, wherein the networking manager is further configured to:

in response to determining that the logical connection has been approved by the particular service provider and the customer, cause a connection identifier of the logical connection between the virtual gateway and the consumer-side limited-access endpoint to be provided to the particular service provider, wherein the connection identifier is specified as a parameter in a command to create the encapsulation protocol tunnel.

4. The system as recited in claim 1, wherein the networking manager is further configured to:

provide, to the customer via a programmatic interface, a set of metrics pertaining to usage of the consumer-side limited-access endpoint, including a metric indicating a number of packets which have been delivered via the consumer-side limited-access endpoint to resources within the service consumer virtual network.

5. The system as recited in claim 1, wherein the networking manager is further configured to:

obtain, via a programmatic interface, from a particular service provider on whose behalf the service provider virtual network was established, additional security settings associated with the virtual gateway, wherein the additional security settings indicate that a first subset of resources of the service provider virtual network is permitted to send packets via the virtual gateway, and that a second subset of resources of the service provider virtual network is not permitted to send packets via the virtual gateway, and wherein the virtual machine belongs to the first subset of resources of the service provider virtual network.

6. A computer-implemented method, comprising:

establishing, by a networking manager of a cloud computing environment, a virtual gateway for transmitting packets from a service provider virtual network to a service consumer virtual network, wherein the service provider virtual network comprises a virtual machine implementing a service accessible to other users of the cloud computing environment, and wherein the service consumer virtual network comprises resources of another user;

creating, based on a programmatic request from the other user that includes an identifier of the service, a limited-access endpoint in the service consumer virtual network, wherein the limited-access endpoint in the service consumer virtual network has security settings provided by the other user to enable, by the limited-access endpoint in the service consumer virtual network, transmission of packet flows originating from the service of the service provider virtual network to a first subset of resources in the service consumer virtual network and also prevent transmission to a second subset of resources of the service consumer virtual network;

receiving, at the virtual gateway, a packet originating from the service and destined for a particular resource in the service consumer virtual network;

verifying that the security settings permit delivery of the packet to the particular resource via the limited-access endpoint; and transmitting the packet to the particular resource.

7. The computer-implemented method as recited in claim 6, further comprising:

creating a communication channel between the virtual machine and the virtual gateway; and storing a mapping between the communication channel and the limited-access endpoint, wherein said verifying comprises utilizing the mapping.

8. The computer-implemented method as recited in claim 7, wherein the communication channel comprises a tunnel of an encapsulation protocol.

9. The computer-implemented method as recited in claim 7, wherein creating the communication channel comprises one or more of: (a) utilizing a kernel driver within an operating system of the virtual machine, (b) creating a virtual interface at a virtualization management offloading card utilized for the virtual machine, or (c) selecting an Internet Protocol Version 6 (IPv6) address to be used to represent the communication channel.

10. The computer-implemented method as recited in claim 6, wherein said receiving the packet originating from the service at the virtual gateway comprises:

receiving an encapsulated packet whose data payload is generated at the virtual machine, wherein a destination address of the encapsulated packet is an address of the particular resource; and wherein transmitting the packet to the particular resource comprises:

transmitting a transformed version of the encapsulated packet to the particular resource, wherein the transformed version comprises the data payload, and wherein a source address of the transformed version is an address of the limited-access endpoint.

11. The computer-implemented method as recited in claim 6, further comprising:

receiving, via one or more programmatic interfaces, an indication of (a) a function to be executed at the service on behalf of the other user without requiring the other user to specify a resource at which the function is to be executed, wherein execution of the function requires access to data stored at the service consumer virtual network and (b) an indication of a condition which is to trigger execution of the function; and in response to detecting, at the service, that the condition has been satisfied, generating at least a portion of the packet at the virtual machine to access data from the particular resource, and wherein the data from the particular resource is required for executing the function.

12. The computer-implemented method as recited in claim 6, wherein the service comprises a remote resource health-checking service, the computer-implemented method further comprising:

determining, at the virtual machine, based at least in part on contents of a response message generated at the particular resource with respect to the packet, a health status of the particular resource; and providing, from the service, to one or more destinations, an indication of the health status of the particular resource.

13. The computer-implemented method as recited in claim 6, wherein the service comprises a remote ephemeral event tracking service, the computer-implemented method further comprising:

determining, at the virtual machine, based at least in part on contents of a response message generated at the particular resource with respect to the packet, one or more ephemeral events which have occurred at the service consumer virtual network, wherein a particular ephemeral event comprises a shutdown of another resource within a particular time interval after a startup of the other resource; and providing, from the service, to one or more destinations, an indication of the one or more ephemeral events.

14. The computer-implemented method as recited in claim 6, wherein the service comprises a software container-based application execution service, the computer-implemented method further comprising:

receiving, via one or more programmatic interfaces, an indication of (a) a software container to be executed at the service on behalf of the other user, wherein execution of the software container requires access to data stored at the service consumer virtual network and (b) an indication of a condition which is to trigger execution of the software container; and in response to detecting, at the service, that the condition has been satisfied, generating at least a portion of the packet at the virtual machine to access data from the particular resource, wherein the data from the particular resource is required for executing the software container.

15. The computer-implemented method as recited in claim 6, further comprising:

establishing, at the cloud computing environment, another virtual gateway for transmission of packets originating at another service provider virtual network to one or more service consumer virtual networks, wherein at least a portion of another service is implemented within the other service provider virtual network;

receiving, at the other virtual gateway, another packet originating from the other service and destined for the particular resource in the service consumer virtual network;

verifying that the security settings permit delivery of the other packet to the particular resource via the limited-access endpoint; and transmitting the other packet to the particular resource.

16. A non-transitory computer-accessible storage medium storing program instructions that when executed on a processor:

establish, by a networking manager of a cloud computing environment, a virtual gateway for transmitting packets from a service provider virtual network to at least a first service consumer virtual network, wherein the service provider virtual network comprises a virtual machine implementing a service accessible to other users of the cloud computing environment, and wherein the first service consumer virtual network comprises resources of a first user;

create, based on a first programmatic request from the first user, a first limited-access endpoint in the first service consumer virtual network, wherein the first limited-access endpoint in the first service consumer virtual network has first security settings provided by the first user to enable, by the limited-access endpoint in the service consumer virtual network, transmission of packet flows originating from the service of the service provider virtual network to a subset of resources in the first service consumer virtual network;

receive, at the virtual gateway, a first packet originating from the service and destined for a first resource in the first service consumer virtual network;

verify that the first security settings permit delivery of the first packet to the first resource via the first limited-access endpoint; and transmit the first packet to the first resource.

17. The non-transitory computer-accessible storage medium as recited in claim 16, wherein the service comprises a multi-tenant application at which operations are performed on behalf of a set of clients of the cloud computing environment including the first user and a second user, the non-transitory computer-accessible storage medium storing further program instructions that when executed on the processor:

create, based on a second programmatic request from the second user, a second limited-access endpoint in a second service consumer virtual network, wherein the second service consumer virtual network comprises resources of the second user, wherein the second limited-access endpoint has second security settings provided by the second user to enable transmission of packet flows originating from the service to a third subset of resources in the second service consumer virtual network;

receive, at the virtual gateway, a second packet originating from the service and destined for a second resource in the second service consumer virtual network;

verify that the second security settings permit delivery of the second packet to the second resource via the second limited-access endpoint; and transmit the second packet to the second resource.

18. The non-transitory computer-accessible storage medium as recited in claim 16, storing further program instructions that when executed on the processor:

store metadata which prohibits packet flows that originate at the first service consumer virtual network and are directed to the service provider virtual network via the first limited-access endpoint or the virtual gateway.

19. The non-transitory computer-accessible storage medium as recited in claim 16, storing further program instructions that when executed on the processor:

provide, via a programmatic interface to a service provider on whose behalf the service provider virtual network is established, a set of metrics pertaining to usage of the virtual gateway.

20. The non-transitory computer-accessible storage medium as recited in claim 16, storing further program instructions that when executed on the processor:

receive, at the virtual gateway, a second packet originating from the service and destined for a second resource in an external premise of the first user; and deliver at least a portion of the second packet to the second resource.

* * * * *